US006938118B1

(12) United States Patent
Blixt et al.

(10) Patent No.: US 6,938,118 B1
(45) Date of Patent: Aug. 30, 2005

(54) CONTROLLING ACCESS TO A PRIMARY MEMORY

(75) Inventors: Sven Stefan Blixt, Bålsta (SE); Björn Stefan Christian Blixt, Bålsta (SE)

(73) Assignee: IMSYS Technologies AB, Upplands Vasby (SE)

( * ) Notice: Subject to any disclaimer, the term of this patent is extended or adjusted under 35 U.S.C. 154(b) by 0 days.

(21) Appl. No.: 09/830,094

(22) PCT Filed: Oct. 25, 1999

(86) PCT No.: PCT/SE99/01923

§ 371 (c)(1),
(2), (4) Date: Aug. 7, 2001

(87) PCT Pub. No.: WO00/25205

PCT Pub. Date: May 4, 2000

(30) Foreign Application Priority Data

Oct. 28, 1998 (SE) .............................. 9803708

(51) Int. Cl.[7] .............................................. G06F 13/00
(52) U.S. Cl. .......................... 711/105; 712/32; 712/245
(58) Field of Search ............................ 711/105; 712/32, 712/41, 245

(56) References Cited

U.S. PATENT DOCUMENTS

| | | | |
|---|---|---|---|
| 5,153,856 A | | 10/1992 | Takahashi |
| 5,652,860 A | | 7/1997 | Sato |
| 5,987,589 A | * | 11/1999 | Kawasaki et al. ............ 712/32 |
| 6,101,584 A | * | 8/2000 | Satou et al. ................. 711/152 |
| 6,192,446 B1 | * | 2/2001 | Mullarkey et al. ........... 711/105 |
| 6,338,108 B1 | * | 1/2002 | Motomura ................... 710/110 |
| 6,691,206 B1 | * | 2/2004 | Rubinstein .................. 711/105 |
| 2002/0004882 A1 | * | 1/2002 | Kai et al. ................... 711/106 |

FOREIGN PATENT DOCUMENTS

| | | |
|---|---|---|
| JP | 9 171 484 | 6/1997 |
| JP | 10 049 437 | 2/1998 |
| JP | 10 105 457 | 4/1998 |
| WO | WO 96/29652 | 9/1996 |
| WO | WO 96/37830 | 11/1996 |
| WO | WO 97/27547 | 7/1997 |

OTHER PUBLICATIONS

Computer Architecture, single and parallel system, , Mehdi R. Zargham, published in 1996 (p. 23–26).*

* cited by examiner

Primary Examiner—Mano Padmanabhan
Assistant Examiner—Jasmine Song
(74) Attorney, Agent, or Firm—Fish & Richardson P.C.

(57) ABSTRACT

The invention relates to a primary memory such as a dynamic random access memory, and a method and controller for controlling access to such a memory. The access control for the primary memory (60) is intimately associated with the microcode instructions of a processor (10) connected to the memory. The access control is integrated into the microcode program (22) of the processor, and each microcode instruction includes a control instruction used in controlling the operation of a memory controller (50). In the case of a DRAM, the DRAM controller (50) controls access to the DRAM (60) by executing, for each DRAM access, a sequence of DRAM control operations in response to a corresponding sequence of control instructions included in the microcode instructions of the processor. Preferably, the control instruction included in each microcode instruction only constitutes a part of the microcode instruction, and the remaining part of the microcode instruction is used by the processor for other purposes, such as determining address information for the DRAM and processing the data that is transferred between processor and DRAM.

40 Claims, 18 Drawing Sheets

CONTROLLING ACCESS TO A PRIMARY MEMORY

TECHNICAL FIELD OF THE INVENTION

The present invention generally relates to a method for controlling access to a primary memory such as a dynamic random access memory (DRAM), a memory controller and a computer system incorporating a memory controller, as well as to a method for performing direct memory access (DMA).

BACKGROUND OF THE INVENTION

In most digital processing systems, such as microprocessor-based computer systems, the main or primary memory is a DRAM. The term "DRAM" is an acronym for "Dynamic Random Access Memory". "Dynamic" indicates that for the memory to remember data, the memory requires every bit to be refreshed within a certain time period. As is well known, data is stored capacitively in a DRAM and hence data must be regenerated regularly to avoid data losses due to capacitive leakage. When the power is removed from the DRAM, the data is lost. "Random Access" indicates that each cell in the memory can be read or written in any order. This contrasts a sequential memory device where data must be read or written in a certain order. The reason behind the popularity of DRAMs for high-capacity memories in digital processing systems is the low cost per bit due to the high memory density.

The memory cells of a DRAM are arranged in rows and columns, and a given memory cell in the DRAM is accessed by first applying a row address and then applying a column address to the DRAM. The row address is strobed into the DRAM by activating a row address strobe (RAS) signal, thus energizing the selected row. The column address is strobed into the DRAM by activating a column address strobe (CAS) signal, and data is selected from the specified column in the energized row. In general, the DRAM address is multiplexed into the DRAM such that the same terminals are used, at different times, for the row address and the column address.

Access to the DRAM is normally controlled by a DRAM controller that generates the necessary control and address signals to the DRAM and determines the sequence and relative timing of these signals.

In general, processor cores are designed to suit simple memories, such as static random access memories (SRAMs), sometimes used as cache memories. Traditionally, the processor-memory interface is designed in such a way that, for each memory access, the processor has to decide whether a read or write operation is to be executed, and also has to determine a complete memory address to be used before initiating the read of write access to the memory. For a DRAM, which is a rather complex memory with a multiplexed addressing procedure, this generally means that the DRAM will be relatively slow with long access times. In this respect, DRAMs are often considered as the bottlenecks of digital processing systems.

A common way of alleviating this problem is to use a small but fast cache memory as a buffer between the processor and the larger and slower DRAM. The cache memory includes copies of small parts of data and/or program information stored in the DRAM. When the processor has to read a memory cell not available in the cache memory, that cell will be copied together with a number of adjacent cells from the DRAM to the cache memory. For subsequent accesses to these cells, the processor then interfaces the fast cache memory instead of the DRAM.

In addition to the processor-memory interface, peripheral input/output devices also need to communicate with the primary memory, which often is a DRAM. For this purpose it is normal practice to use a standard technique called direct memory access (DMA). DMA is generally a technique devised to allow peripheral devices to communicate with the primary memory without significantly involving the processor. The processor merely initializes a DMA controller to take or receive a determined number of bytes from or to the primary memory starting at a predetermined location. The processor then suspends any task that cannot resume until the DMA transfer is completed, and gets on with the next highest priority task. Upon completion of the DMA transfer, the DMA controller informs the computer that the DMA transfer is complete. In response, the processor suspends the current task and resumes the task that originally requested the DMA. If the resumed task is now complete, the suspended task or a higher priority task may be resumed.

RELATED ART

The international patent application WO 96/37830 relates to a microprocessor with a pipelined access request to an external DRAM. Memory requests are pipelined to the external DRAM by calculating a memory address during the same clock cycle that the instruction associated with the address is latched by an execution stage, issuing an early ready signal and directing the information received from the external DRAM to a register file during the same clock cycle that the information is received.

The internal patent application WO 96/29652 relates to a rule-based DRAM controller. A DRAM controller asserts memory access and control signals based on predefined control rules. Certain rules are used to determine the timing and sequence of the memory accessing signals and control signals output by the DRAM controller. The control rules are implemented as logic within the controller, while the conditions for the rules are provided from various monitoring signals and timing modules. Based upon these rules and conditions, the request inputs to the controller are interpreted to provide optimum access speed to the DRAM.

The international patent application WO 96/30838 relates to a DRAM controller. The DRAM controller is designed to reduce the access time for read and write cycle accesses in a memory system with page mode accesses, by rearranging the processing order to the read and write cycle access requests.

U.S. Pat. No. 5,381,538 discloses a direct memory access (DMA) controller for exchanging data between a system memory and an input/output device in an initial data exchange mode and an alternate data exchange mode. The DMA controller includes a FIFO register for exchanging data during both operating modes, and a residual register for storing residual data upon commencement of the alternate data exchange mode and for providing the residual data when the initial data exchange mode is restarted.

SUMMARY OF THE INVENTION

It is a general object of the present invention to reduce the time required for accessing a primary memory such as a DRAM.

It is a particular object of the invention to provide a method for controlling access to a DRAM such that access times comparable to those of SRAMs are obtained.

Another object of the invention is to provide a DRAM controller, preferably incorporated in a microprocessor-based computer system, which provides fast access to a DRAM.

Yet another object of the invention is to provide a computer system with a memory controller, which provides fast and efficient access to the primary memory of the computer system.

Still another object of the invention is to provide a method for performing a virtual direct memory access to the primary memory of a computer system.

It is also an object of the invention to provide a computer system implementing means for transferring data between a peripheral input/output device and the primary memory of the computer system.

These and other objects are met by the invention as defined by the accompanying patent claims.

In accordance with the invention, the access control for the primary memory is intimately associated with the microcode instructions of the processor. The interface between the processor and the memory controller is customized in such a way that the memory access control is integrated into the microcode program of the processor. Each microcode instruction of the processor includes a control instruction that is used in controlling the operation of the memory controller.

Preferably, the primary memory is a DRAM, and the memory controller is a DRAM controller. More particularly, the DRAM controller controls access to the DRAM by executing, for each DRAM access, a sequence of DRAM control operations in response to a corresponding sequence of control instructions included in the microcode instructions of the processor.

It is important to understand that the control instruction included in each microcode instruction only constitutes a part of the microcode instruction, and that the remaining part of the microcode instruction is used by the processor for the control of other operations such as determining address information for the DRAM and processing data to/from the DRAM.

Since each DRAM access is based on a sequence of DRAM control operations, each of which is controlled by a respective control instruction in a microcode instruction, a DRAM access can be initiated by performing the first DRAM control operation in the sequence, without having all the information required for subsequent DRAM control operations in the sequence. The information required for a subsequent DRAM control operation is preferably determined by the current microcode instruction in parallel with the execution of the first DRAM control operation.

For example, the microcode program can initiate a DRAM access before it has been described whether a read or write access should be performed, and the row address can be applied to the DRAM before the column address has been determined. This substantially reduces the access time for a DRAM access.

Each control instruction determines which one of a number of predefined DRAM control operations that the DRAM controller will execute. Under the control of the control instructions in the microcode program of the processor, these predetermined DRAM control operations can be arranged in sequence to give almost any type of DRAM access, such as a read, write, page mode read, page mode write, page mode read write and page mode write read access.

This means that the microcode program itself freely can use page mode whenever appropriate, thus saving valuable time. In page mode, there is generally no need for a cache memory since the activated row will act as "cache memory".

In addition to the processor-memory interface being microcode controlled, communication between peripheral input/output devices and the primary memory is accomplished via the internal data paths of the processor, using the microcode control of the processor-memory interface. This approach clearly contrasts conventional direct memory access (DMA) techniques. Using the internal data paths of the processor for data transfers between I/O devices and the primary memory gives so-called "virtual" DMA transfers.

By integrating the control of virtual DAM transfers into the microcode instruction program of the processor, a minimum of hardware control logic is required. Also, this approach substantially improves the flexibility of the DMA transfer control since the microcode instruction program controlling the DMA transfers can be adapted to meet specific demands. For example, it is possible to include data processing and/or monitoring in the transfer of data.

By using the internal data paths of the processor, only a single common memory interface is required for processor-to-memory transfers as well as virtual DMA transfers.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
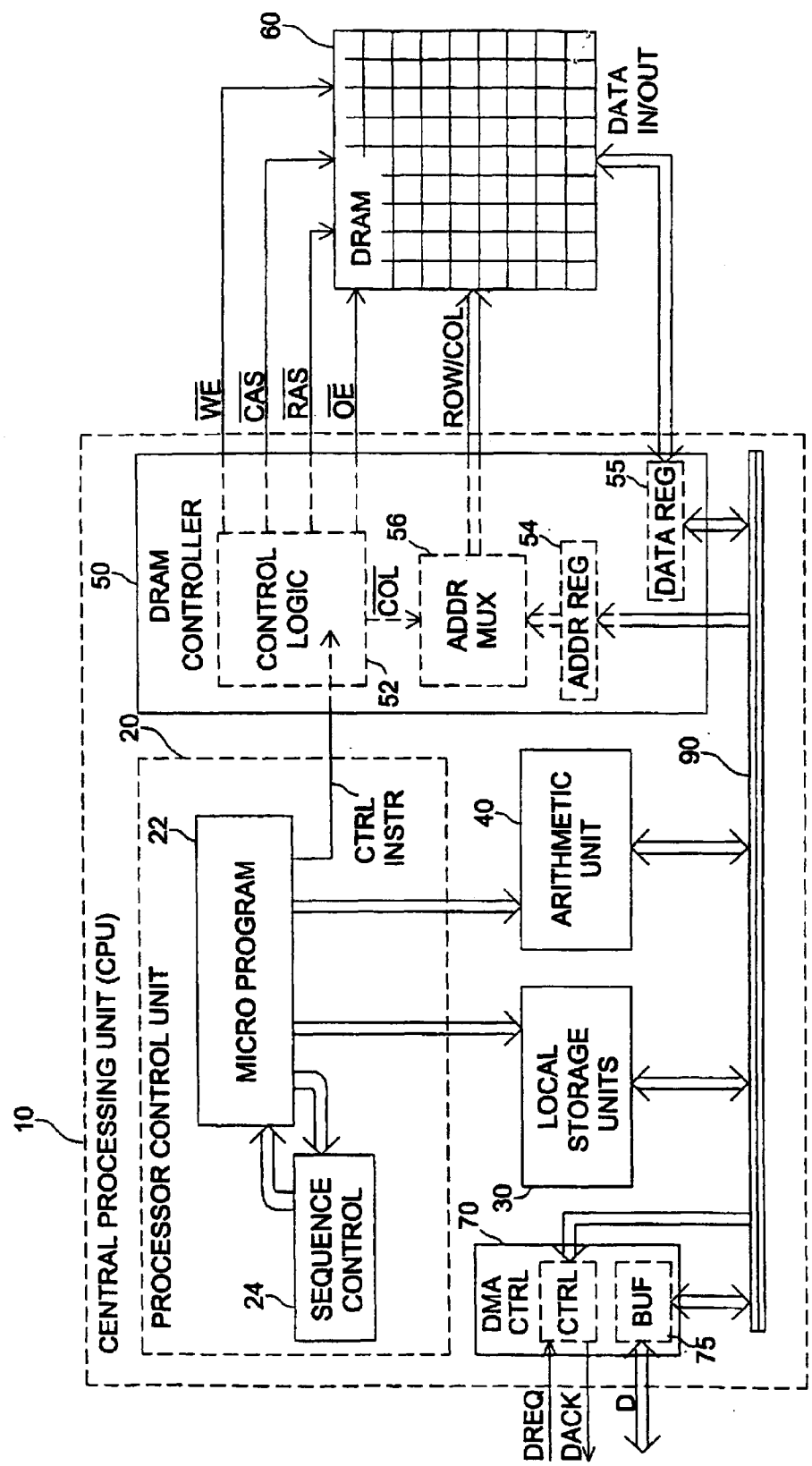
FIG. 1 is a schematic block diagram illustrating an example of a computer system according to a preferred embodiment of the invention.

Throughout the drawings, the same reference characters will be used for corresponding or similar elements.

FIG. 1 is a schematic block diagram illustrating an example of a computer system according to a preferred embodiment of the invention. The computer system basically comprises a central processing unit (CPU) 10, a primary memory such as dynamic random access memory (DRAM) 60.

The CPU 10, also referred to as the processor, comprises a processor control unit 20, local storage units 30, an arithmetic unit 40, a DRAM controller 50, a DMA controller 70 having a DAM buffer 75, and a bus structure 90. The CPU 10 is controlled by microcode instructions stored in a microcode program 22. The microcode program 22 cooperates with a sequence control unit 24 that determines the address to the next microcode instruction in the microcode program. The arithmetic unit 40 is provided to perform arithmetical/logical operations on data to/from the DRAM 60 and on data to/from peripheral I/O devices. The bus structure 90 preferably includes two busses, a so-called DBUS and a so-called YBUS, which are used for bus communication between the different units of the CPU. In general, the DBUS is a source bus to the arithmetic unit, and the YBUS is the result bus from the arithmetic unit. The DBUS as well as the YBUS are also utilized to load different registers and buffers as will be explained with reference to FIG. 3.

The DRAM controller 50 is connected between the RAM 60 and the control unit 20 of the CPU 10, and controls the flow of data in and out of the DRAM. The DRAM controller 50 generates address signals ROW/COL and various control signals WEn, CASn, RASn, OEn (the suffix n indicates that the signals are active low) in a predetermined sequence under the control of the control unit 20, and applies these signals to the DRAM 60, thereby controlling the operation of the DRAM. The DRAM controller 50 comprises control logic 52, an address register 54 for storing address information received via the bus 90, a data register 55 for holding data to/from the DRAM and an address multiplexer 56 controlled by two complementary signals COL and COLn for applying the row address or the column address to the DRAM 60.

In FIG. 1, the data register 55 represents a data-to-memory (DTM) register as well as a data-from-memory (DFM) register. In practice, however, the DTM register and the DFM register are physically separate registers.

The DMA controller 70 has a control unit (CTRL) and a DMA buffer for DMA transfers of data between peripheral I/O devices (not shown in FIG. 1) on one hand and the CPU 10 and the primary DRAM memory 60 on the other hand. The DMA control unit is controlled by control signals received from the processor control unit 20 via the bus structure 90, and it receives a DMA request signal DREQ from a peripheral, and acknowledges a DMA transfer by a corresponding DACK signal. The DMA controller will be described in more detail later with reference to FIGS. 9 to 11.

A general idea according to the invention is to integrate the DRAM access control into the microcode instructions of the microcode program 22. Each microcode instruction includes a control instruction that is used in controlling the operation of the DRAM controller 50. Furthermore, for each DRAM access, the operation of the DRAM controller 50 is divided into a sequence of a predetermined number of DRAM control operations. The DRAM controller 50 controls access to the DRAM by executing, for each access, a sequence of DRAM control operations in response to a corresponding sequence of control instructions included in the microcode instructions of the microcode program 22.

Each control instruction in the sequence of control instructions from the microcode program 22 to the DRAM controller 50 determines which one of a number of predefined DRAM control operations that the DRAM controller 50 will execute. By forwarding appropriate control instructions from the microcode program 22, the sequence of DRAM control operations can be customized to give different types of DRAM accesses, such as read, write, page mode read, page mode write, page mode read write and page mode write read accesses.

It is important to understand that each control instruction is formed by a predetermined part of a microcode instruction. The remaining part of the microcode instruction is used for other purposes such as determining address information for the DRAM or executing high-level instructions collected from the DRAM.

Figure 2:
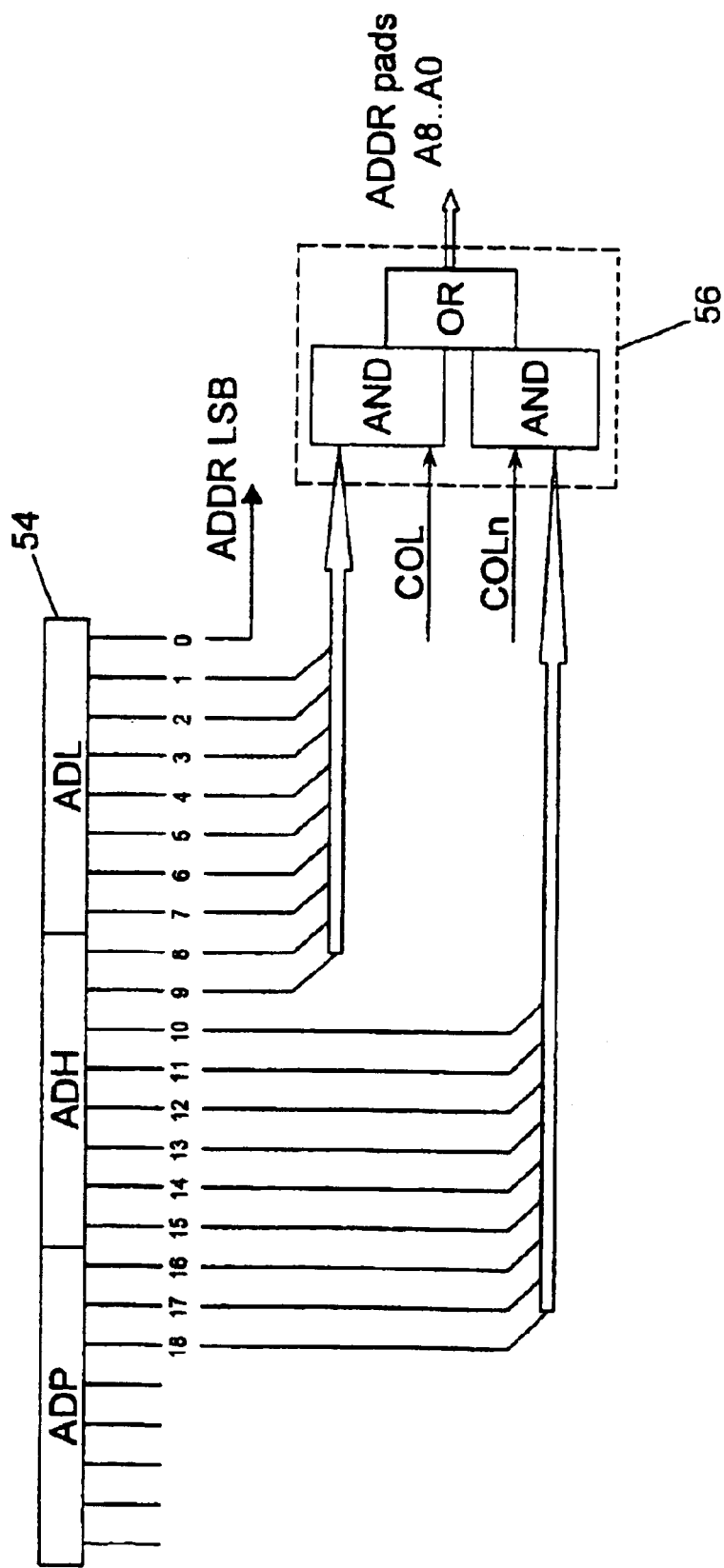
FIG. 2 is a schematic block diagram of an address register and an address multiplexer used by the invention.

For completeness, the address register 54, and the address multiplexer 56 are shown in more detail in FIG. 2. In this particular example, the address register 54 contains three address portions, ADL (Address Low), ADH (Address High) and ADP (Address Page). The row address to the DRAM is stored in ADP and ADH in bits 10–18, and the column address to the DRAM is stored in ADH and ADL in bits 1–9. The address multiplexer 56 comprises two AND-gates followed by an OR-gate. The first AND-gate receives the column address from ADH and ADL, and the COL signal. The second AND-gate receives the row address from ADP and ADH, and the COLn signal. If COLn is inactive, i.e. high, the row address is output by the OR-gate. However, if COLn is active, i.e. low, the column address is output by the OR-gate.

Figure 3:
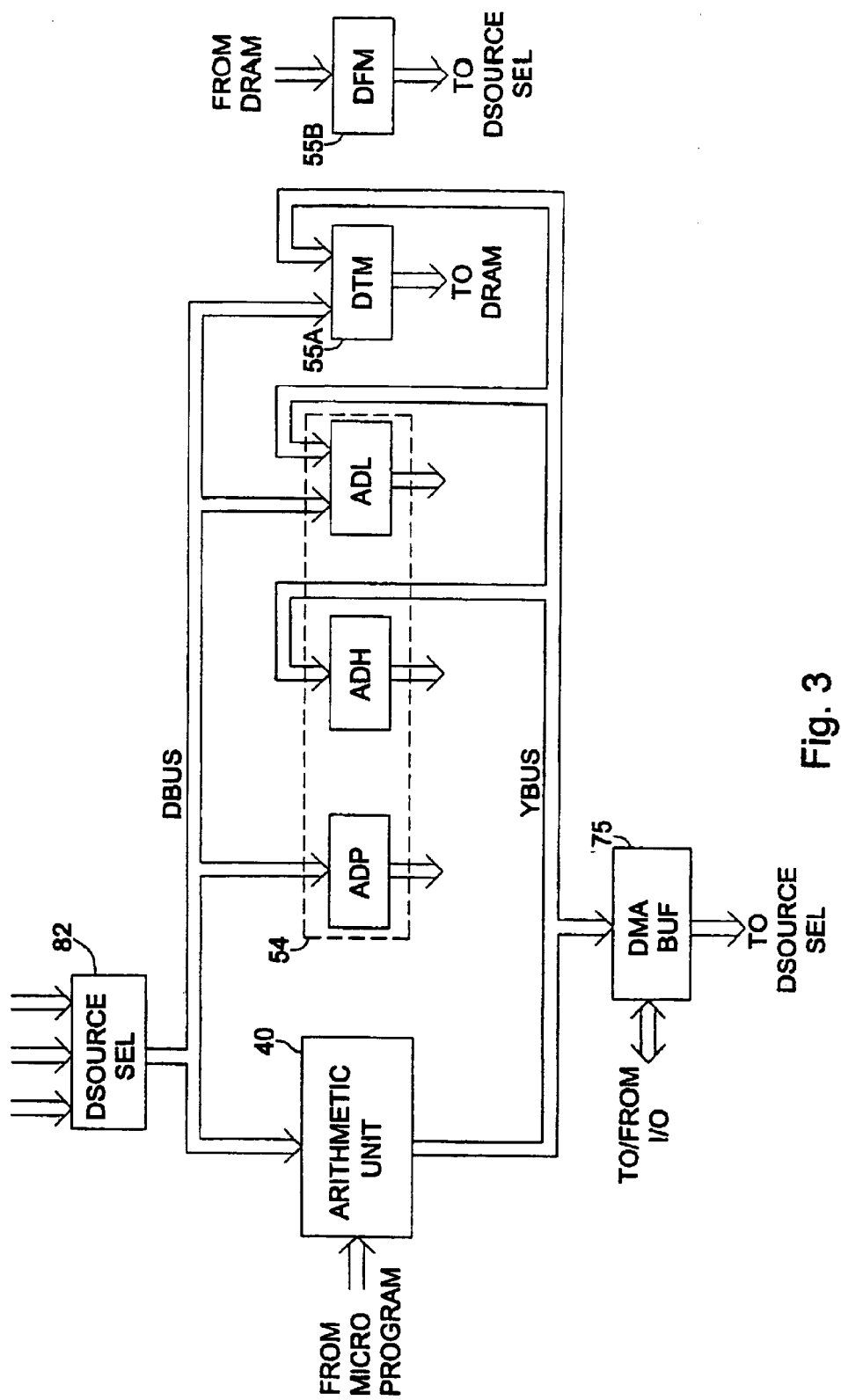
FIG. 3 is a schematic diagram illustrating a practical implementation of the interface between the arithmetic unit, the address register, the data registers and the DMA buffer according to an embodiment of the invention.

FIG. 3 is a schematic diagram illustrating a practical implementation of the interface between the arithmetic unit 40, the address register 54, the data registers 55 and the DMA buffer 75 according to an embodiment of the invention. The data registers 55 are two physically separate registers; a data-to-memory (DTM) register 55A, and a data-from-memory (DFM) register 55B. Data from a number of data sources, of which the DFM register 55B and the DMA buffer 75 are two examples, is received by a data source selector 82, the output of which forms the DBUS interface to the arithmetic unit 40, the ADP and ADL registers and the DTM register 55A. The output of the arithmetic unit 40 forms the YBUS interface to the ADH and ADL registers, the DTM register 55A and to the DMA buffer 75. The arithmetic unit 40 is responsive to microcode from the microprogram (cf. FIG. 1). As can be seen from FIG. 3, ADL register and the DTM register can be loaded either from the DBUS or the YBUS.

For a better understanding of the invention, the invention will now be explained with reference to an illustrative example of a number of predefined DRAM control operations.

Figure 4:
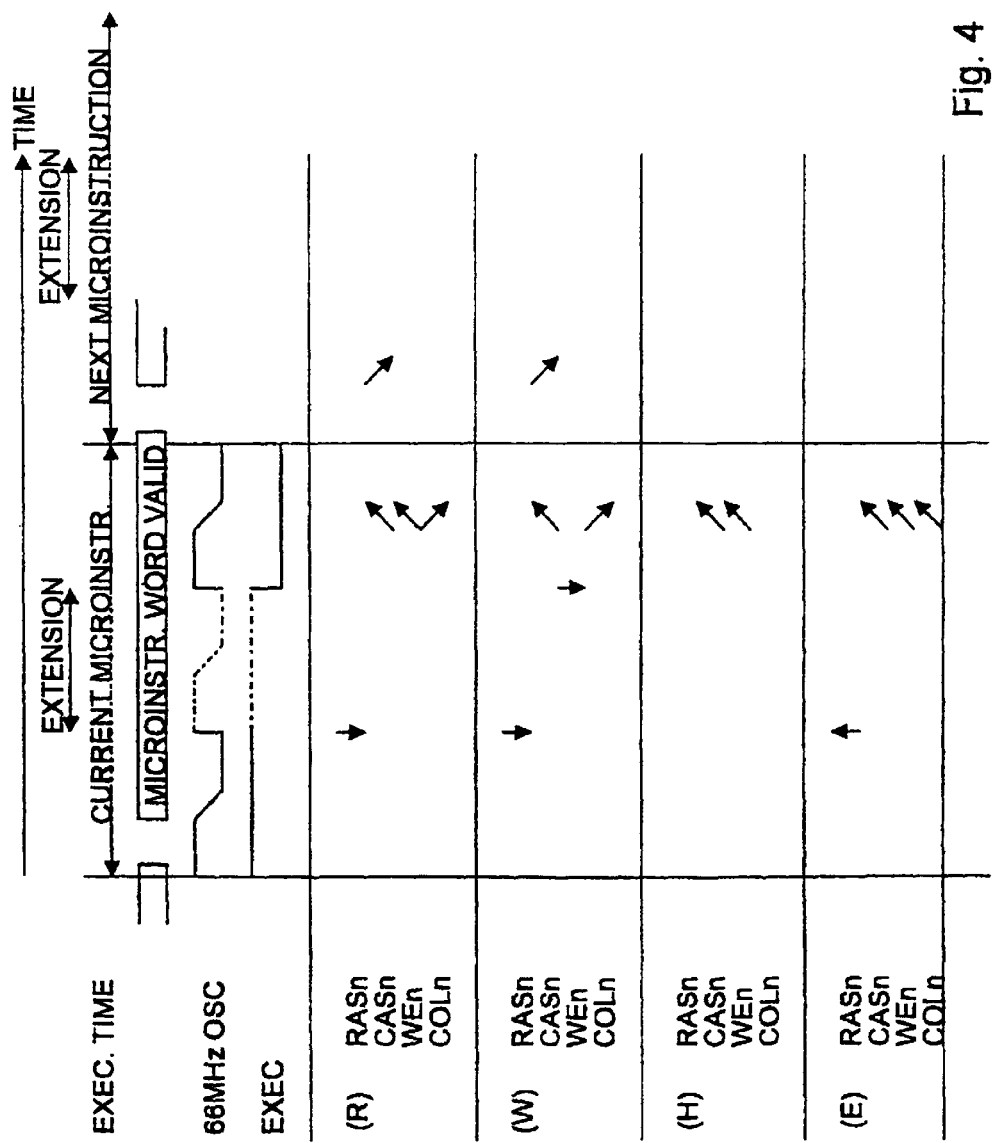
FIG. 4 is a schematic timing diagram of a number of DRAM control operations according to a preferred embodiment of the invention.

FIG. 4 is a schematic timing diagram of a number of DRAM control operations according to a preferred embodiment of the invention. In this particular example, a 66 MHz main oscillator is utilized, and the main clock signal for the microcode instructions is designated by EXEC. For slanting edges, the position depends on the duty cycle of the 66 MHz oscillator, varying between 46% to 54%. The time period between vertical edges, as well as between slanting edges is 15 ns, and the time period between a vertical edge and a slanting edge is then between 6.9 ns and 8.1 ns.

Furthermore, the cycle time of each microcode instruction is adjustable in such a way that each microcode instruction can take one of a number of different values for the microconstruction cycle time so that the cycle time of each microcode instruction will match the duration of a corresponding DRAM control operation. For this purpose, each microcode instruction includes a cycle time control instruction that determines the cycle time of the microcode instruction.

In the example of FIG. 4, two different cycle times are used; 30 ns or 45 ns. By using a cycle time control instruction formed by a single bit the cycle time may be extended from the normal 30 ns cycle time (indicated by a first logical state of the cycle time control bit) to a 45 ns cycle time (indicated by a second logical state of the cycle time control bit). The 30 ns cycle time takes 2 cycles of the 66 MHz main oscillator clock ,and the 45 ns cycle times takes 3 cycles of the main oscillator clock, as indicated by the dotted lines in FIG. 4.

In FIG. 4, all signals are active low and this is indicated by the suffix n; SIGNALn. The DRAM control operations illustrated in FIG. 4 are R (Start Read), W (Start Write), H (Hold) and E (End Row Access), all of which will be explained below.

The R-operation (Start Read):

RASn is pulled down 15 ns after the start of the current microcode instruction, if RASn is not low already;

CASn is pulled up 7.5 ns before the end of the current microcode instruction, if CASn is not high already, and 7.5 ns after the start of the next microcode instruction, CASn is pulled down;

WEn is pulled up 7.5 ns before the end of the current microcode instruction, if WEn is not high already; and COLn is pulled down 7.5 ns before the end of the current microcode instruction, if COLn is not low already.

The W-operation (Start Write):

RASn is pulled down 15 ns after the start of the current microcode instruction, if RASn is now low already;

CASn is pulled up 7.5 ns before the end of the current microcode instruction, if CASn is not high already, and 7.5 ns after the start of the next microcode instruction, CASn is pulled down;

WEn is pulled down 15 ns before the end of the current microcode instruction, if WEn is not low already; and COLn is pulled down 7.5 ns before the end of the current microcode instruction, if COLn is not low already.

The H-operation (Hold):

CASn is pulled up 7.5 ns before the end of the current microcode instruction, if CASn is not high already;

WEn is pulled up 7.5 ns before the end of the current microcode instruction, if WEn is not high already.

The E-operation (End):

RASn is pulled up 15 ns after the start of the current microcode instruction, if RASn is not high already;

CASn is pulled up 7.5 ns before the end of the current microcode instruction, if CASn is not high already;

WEn is pulled up 7.5 ns before the end of the current microcode instruction, if WEn is not high already; and COLn is pulled up 7.5 ns before the end of the current microcode instruction, if COLn is not high already.

The DRAM controller 50 is instructed by a sequence of control instructions, one control instruction in each microcode instruction of the microcode program 22, to execute a corresponding sequence of DRAM control operations. In the case of a total of four different DRAM control operations, two control bits in each control instruction are sufficient to select one of the four operations. In the present embodiment, the control instruction field, designated by MEMCP, in the microcode instructions is designed to distinguish between the different DRAM control operations in the following way;

TABLE I

| MEMCP field | DRAM control operation |
|---|---|
| 0 0 | R |
| 0 1 | W |
| 1 0 | H |
| 1 1 | E |

Figure 5:
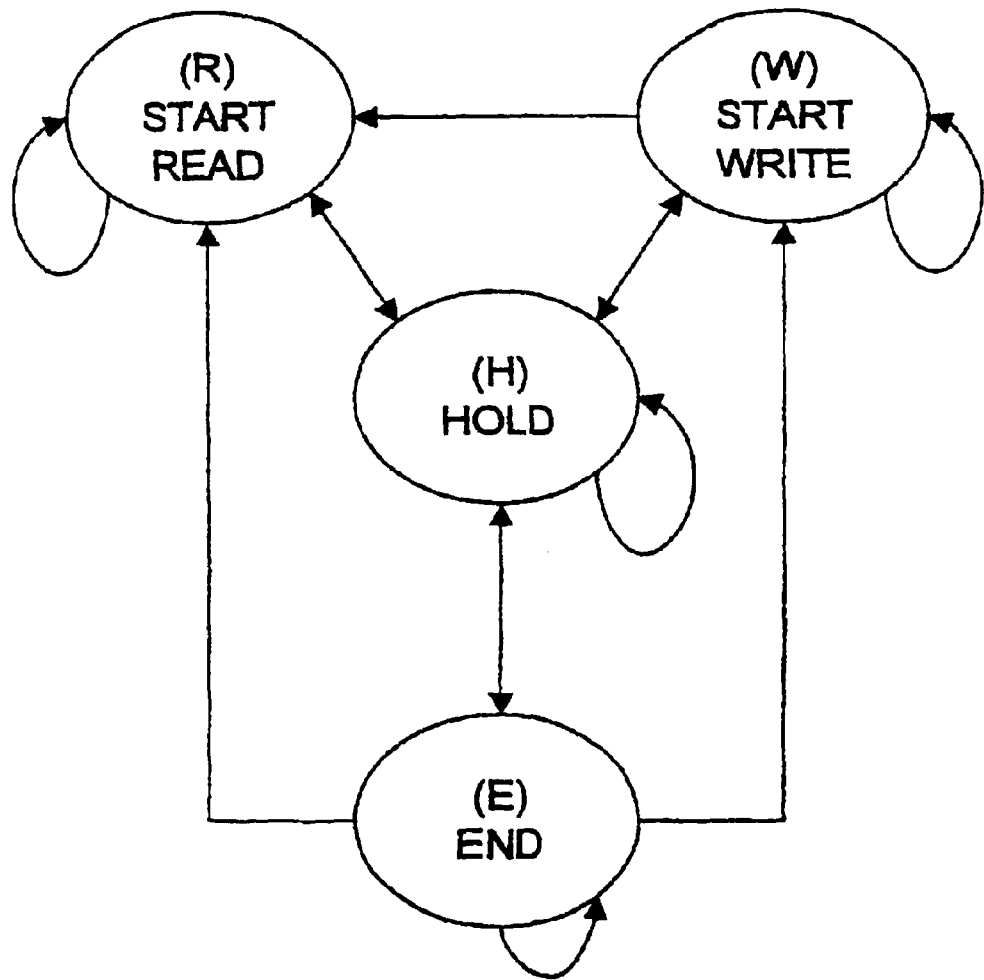
FIG. 5 is a schematic state diagram illustrating how the DRAM control operations can be arranged into DRAM accesses according to a preferred embodiment of the invention.

FIG. 5 is a schematic state diagram illustrating how the DRAM control operations can be arranged into DRAM accesses according to a preferred embodiment of the invention. All operations can follow an E-operation. An R-operation can be followed by an H-operation, which in turn can be followed by any type of operation. An R-operation or an H-operation can follow a W-operation. All operations can be iterated, i.e. repeated as many times as desired.

A DRAM access may be initiated by performing an R-operation, after an E-operation. During this microinstruction cycle, the row address must be valid in ADP and ADH. The next DRAM control operation must be of type R or H, and during this microinstruction cycle, the column address must be valid is ADH and ADL. For an R-operation that does not initiate the DRAM access, the row address need not be valid. In the subsequent microinstruction cycle when a further DRAM control operation is started in accordance with the state diagram of FIG. 5, data corresponding to the applied DRAM address, i.e. the row and column address, is available and can be used by the microcode instruction. Data can be used by subsequent microcode instructions as well, if not replaced by data from a new read-out.

A DRAM access may also be initiated by performing a W-operation, after an E-operation. During this microinstruction cycle, the row address must be valid in ADP and ADH. The next DRAM control operation must be of type W, R or H, and during this microinstruction cycle, the column address must be valid in ADH and ADL, and the data to be written to the applied DRAM address must be valid in the data-to-memory register. For a W-operation that does not initiate the DRAM access, the row address need not be valid.

The H-operation can be inserted anywhere as a "no operation" to temporarily put the DRAM access cycle on hold, for example when the steps required for the DRAM access are not sufficient to accomplish the work to be done by the microcode program as specified by other fields of the microcode instructions. In this case, the requirement on valid column address in ADH and ADL is connected to the previous DRAM control operation being of type R or W. Similarly, the requirement on valid data in the DTM register always appears one step after a W-operation.

The H-operation has been chosen as the default type of operation, since it can be inserted anywhere. The E-type operation is also allowed as a "no operation", but only when the DRAM is idle, i.e. in any sequence between an E-operation and the next R- or W-operation.

For example, a normal DRAM read access can be made in three microinstruction cycles. During each microcode instruction, the control instruction includes in the microcode instruction instructs the DRAM controller 50 to perform a DRAM control operation. For a read access, a sequence of the control operations R, H and E is normally performed. At the first DRAM control operation, R, the row address is valid in the address register 54 and the row address is strobed into the DRAM 60 by the control signal RASn. In the microinstruction cycle, in which R-operation is being initiated, the microcode instruction also loads the column address into the address register 54. At the second DRAM control operation, H, the column address, loaded into the address register in the previous microinstruction cycle, is strobed into the DRAM by the control signal CASn. At the third DRAM control operation, E, a data-from-memory latch (not shown) presents data from the DRAM. The data is available to be used by the current microcode instruction or subsequent microcode instructions.

In the following, examples of DRAM control operation sequences for a number of different DRAM accesses are shown in Table II.

TABLE II

| DRAM ctrl op. | Requirements/status relevant for the Contents of other parts of the microinstruction | | Comment |
|---|---|---|---|
| Read: | | | |
| (R) | Row addr in ADH | | Begin row access, start read |
| (H) | Col addr in ADL | | |
| (E) | | Data available | Read, end row access |
| Read - page mode: | | | |
| (R) | Row addr in ADH | | Begin row access, start read (#1) |
| (R) | Col addr (#1) in ADL | | Start read (#2) |
| (R) | Col addr (#2) in ADL, | Data (#1) available | Read (#1), start read (#3) |
| (R) | Col addr (#3) in ADL, | Data (#2) available | Read (#2), start read (#4) |
| (R) | Col addr (#4) in ADL, | Data (#3) available | Read (#3), start read (#5) |
| (H) | Col addr (#5) in ADL, | Data (#4) available | Read (#4) |
| (E) | | Data (#5) available | Read (#5), end row access |
| Write: | | | |
| (W) | Row addr in ADH | | Begin row access, start write |
| (H) | Col addr in ADL, | Data from DTM | Write |
| (E) | | | End row access |
| Write - page mode: | | | |
| (W) | Row addr in ADH | | Begin row access, start write (#1) |
| (W) | Col addr (#1) in ADL | Data (#1) in DTM | Write (#1), start write (#2) |
| (W) | Col addr (#2) in ADL, | Data (#2) in DTM | Write (#2), start write (#3) |
| (W) | Col addr (#3) in ADL, | Data (#3) in DTM | Write (#3), start write (#4) |
| (W) | Col addr (#4) in ADL, | Data (#4) in DTM | Write (#4), start write (#5) |
| (H) | Col addr (#5) in ADL, | Data (#5) in DTM | Write (#5) |
| (E) | | | End row access |
| Read first, then write: | | | |
| (R) | Row addr in ADH | | Begin row access, start read |
| (C) | Col addr (#1) in ADL | | |
| (W) | | Data (#1) available | Read, start write |
| (H) | Col addr (#2) in ADL, | Data (#2) in DTM | Write |
| (E) | | | End row access |
| Page mode read first, then page mode write: | | | |
| (R) | Row addr in ADH | | Begin row access, start read (#1) |
| (R) | Col addr (#1) in ADL | | Start 2nd read (#2) |
| (R) | Col addr (#2) in ADL, | Data (#1) available | Read (#1), start read (#3) |
| (C) | Col addr (#3) in ADL, | Data (#2) available | Read (#2) |
| (W) | | Data (#3) available | Read (#3), start write (#4) |
| (W) | Col addr (#4) in ADL, | Data (#4) in DTM | Write, start next write (#5) |
| (W) | Col addr (#5) in ADL, | Data (#5) in DTM | Write, start next write (#6) |
| (H) | Col addr (#6) in ADL, | Data (#6) in DTM | Last write |
| (E) | | | End row access |
| Write first, then read: | | | |
| (W) | Row addr in ADH | | Begin row access, start write |
| (R) | Col addr (#1) in ADL | Data (#1) in DTM | Write, start read (#2) |
| (H) | Col addr (#2) in ADL, | | |
| (E) | | Data (#2) available | Read (#2), end row access |
| Page mode write first, then page mode read: | | | |
| (W) | Row addr in ADH | | Begin row access, start 1st write |
| (W) | Col addr (#1) in ADL | Data (#1) in DTM | 1st write, start 2nd write |
| (W) | Col addr (#2) in ADL, | Data (#2) in DTM | 2nd write, start 3rd write |
| (R) | Col addr (#3) in ADL, | Data (#3) in DTM | 3rd write, start read (#4) |
| (R) | Col addr (#4) in ADL, | | Start read (#5) |
| (R) | Col addr (#5) in ADL, | Data (#4) available | Read (#4), start read (#6) |

TABLE II-continued

| DRAM ctrl op. | Requirements/status relevant for the Contents of other parts of the microinstruction | Comment |
| --- | --- | --- |
| (H) | Col addr (#6) in ADL, Data (#5) available | Read (#5) |
| (E) | Data (#6) available | Read (#6), end row access |

"Row addr in ADH" means:

Contents of ADP and (mainly) ADH during this microcode instruction (loaded into the registers by earlier microcode instructions) will be fed to the DRAM and used as row address for all DRAM accesses until a microcode instruction with the "E" code in the MEMCP field has been executed. Loading ADP or ADH in this microcode instruction is allowed but will not have any effect on these memory accesses.

"Col addr in ADL" means:

Contents of ADH and (mainly) ADL during this microcode instruction (loaded into the registers by earlier microcode instructions) will be fed to the DRAM and used as column address for this DRAM access (which was started by R or W in the previous microcode instruction). Loading ADH or ADL in this microcode instruction is allowed but will not have any effect on this memory access.

"Data in DTM" means:

Contents of DTM register during this microcode instruction (loaded into the register by earlier microcode instruction) will be fed to the DRAM and used as data for this DRAM access (which was started by W in the previous microcode instruction). Loading DTM in this microcode instruction is allowed but will not have any effect on this memory access.

"Data available" means:

The DFM (data-form-memory) latch now presents data from DRAM, available to be used by this microcode instruction. The contents will continue to be available until changed by a new read access, marked here by a new "Data available" note.

"#1", "#2", etc. means:

These numbers mark different memory accesses, to show the correspondence between column addresses and data bytes.

As can be seen, each DRAM control operation more or less corresponds to a sub cycle of a complete DRAM access.

The microcode integrated access control is particularly advantageous for processors that have to determine the DRAM address in two steps; for example an 8-bit processor interfacing a DRAM with 16-bit addressing. The DRAM access can be initiated before the complete DRAM address has been determined.

Figure 6:
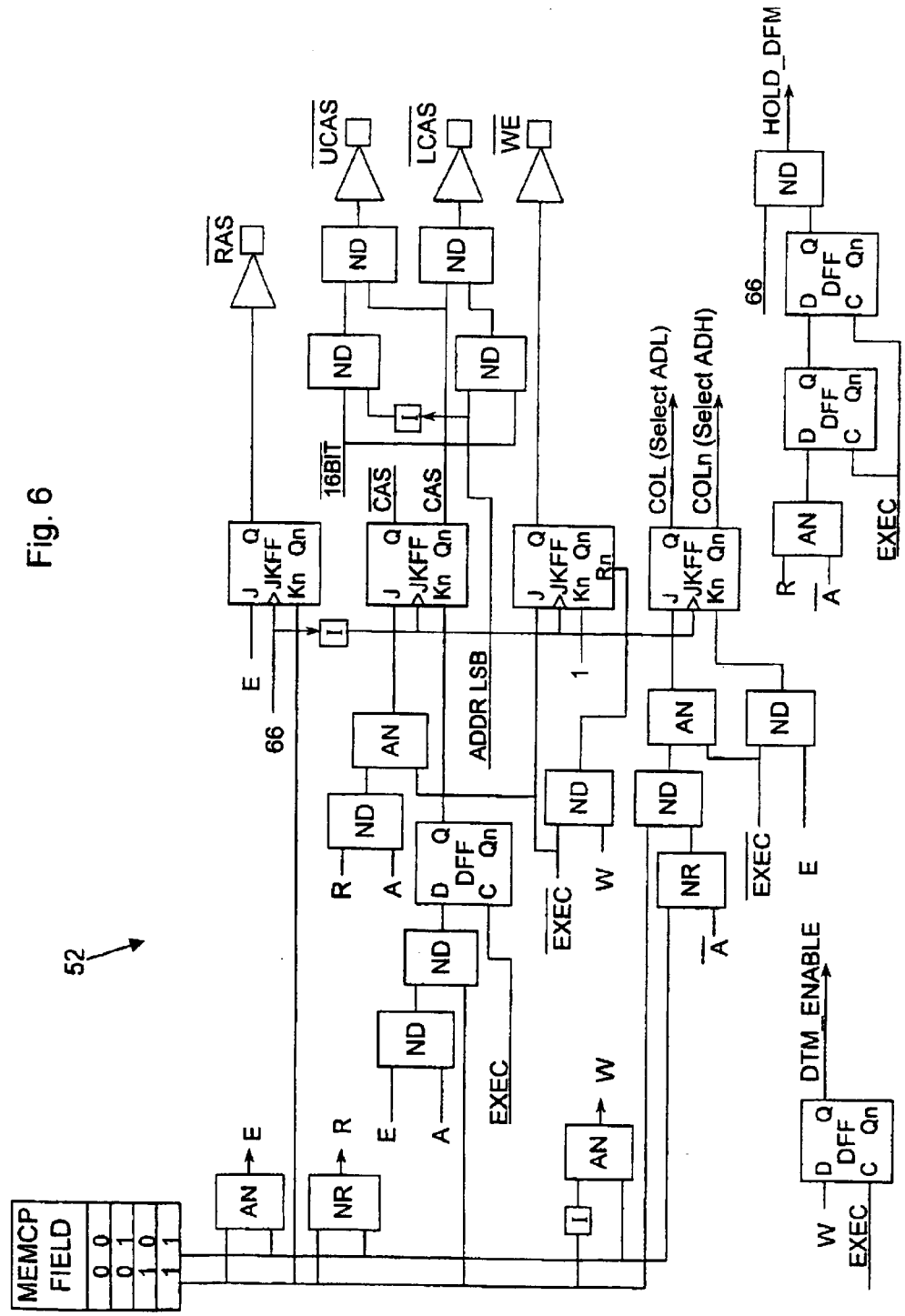
FIG. 6 is a schematic diagram of the DRAM control logic in a DRAM controller according to a preferred embodiment of the invention.

FIG. 6 is a schematic diagram of the DRAM control logic in a DRAM controller according to a preferred embodiment of the invention. The DRAM control logic 52 is implemented by using a number of conventional gates (AND-gates AN, NOR-gates NR and NAND-gates ND), flip-flops (DFF and JKFF) and inverters (I). The control logic 52 is responsive to the control instructions in the MEMCP field of the microcode instructions in the microcode program 22. For each microcode instruction received from the microcode program 22, the control logic 52 generates DRAM control signals for a predetermined sub cycle of a DRAM access in response to the control bits in the MEMCP field.

In this particular embodiment, the two control bits in the MEMCP field of the current microcode instruction are applied to the gates AN, NR, AN following the inverter I, to generate a number of signals E, R and W which in turn are fed to different gates and flip-flops in the control logic 52. In addition, the first MEMCP control bit is applied to a JK flip-flop, and two NAND-gates ND. The second MEMCP control bit is furthermore applied to a NOR-gate NR. The signal A is the output of a flip-flop ALLRAS used for setting a RAS signal to all memory circuits in the DRAM during a refresh cycle. The signal 66 is the output signal of the 66 MHz oscillator, and EXEC is the main clock signal for the microcode instructions.

In response to the MEMCP control bits, the DRAM control signals RASn, CASn, WEn, COL and COLn are generated. If a 16-bit DRAM is used, the CAS signal may be utilized together with the ADDR LSB from the address register 54 and a further control signal 16BITn to selectively generate UCASn and LCASn signals. UCASn stands for Column Address Strobe/Upper Byte Control Bit, and LCASn stands for Column Address Strobe/Lower Byte Control Bit. The signals UCASn and LCASn are used in a conventional manner to access respective parts of the 16-bit DRAM.

Furthermore, a flip-flop DFF generates a data-to-memory enable (DTM_ENABLE) signal in response to the signals W and EXEC. The DTM_ENABLE signal controls the data-to-memory register. As can be seen from FIG. 6, the control logic 52 also generates a hold-data-from-memory (HOLD_DFM) signal that controls the data-from-memory latch (not shown).

Further detailed information on DRAMs and DRAM control can be found, for example in the data book *MOS Memory DRAM (Byte/Word Wide)* from Toshiba (1995), and particularly the DRAM specification TC51V4265DJ/DFT-60, -70 on pages 1064–1634 thereof.

FIGS. 7A–E are schematic signal timing diagrams of different DRAM accesses according to a preferred embodiment of the invention.

Figure 7A:
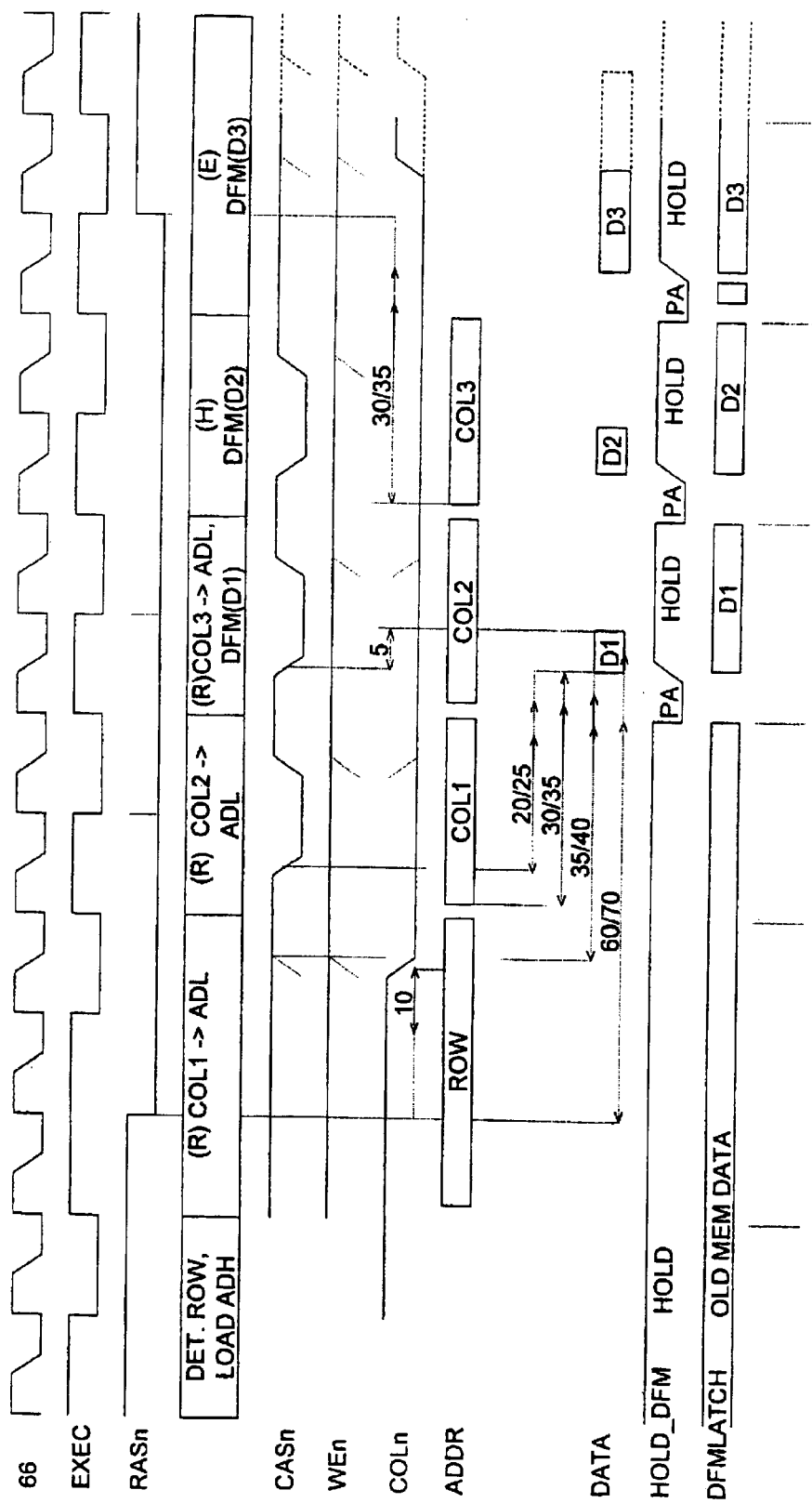
FIGS. 7A–7E are schematic signal timing diagrams of different DRAM accesses according to a preferred embodiment of the invention.

FIG. 7A is a schematic timing diagram of a page mode read access according to a preferred embodiment of the invention. As detailed in Table II above, the sequence of DRAM control operations includes a predetermined number of R-operations followed by an H-operation and an E-operation.

In the first microinstruction cycle, 30 ns long, the microcode instruction determines a row address ROW and loads it into ADH.

In the second microinstruction cycle, which is extended to 45 ns, an R-operation is executed and a first column address COL1 is determined by the microcode instruction and loaded into DL. The row address ROW is strobed into the DRAM, activating the selected row.

In the third microinstruction cycle which also may be extended to 45 ns depending on the cycle time of the DRAM used, an R-operation is executed once again and a second column address COL2 is determined by the microcode instruction and loaded into ADL. The column address COL1 is strobed into the DRAM.

In the fourth microinstruction cycle, an R-operation is executed again and a third column address COL3 is determined by the microcode instruction and loaded into ADL. The column address COL2 is strobed into the DRAM. Now, the DFM latch, controlled by the HOLD_DFM signal, presents the first data D1, associated with the DRAM address (ROW, COL1), from the DRAM. The data source DSOURCE is the DFM latch holding data D1.

In the fifth microinstruction cycle, an H-operation is executed. The column address COL3 is strobed into the DRAM. The DFM latch now presents the next data D2, associated with the DRAM address (ROW, COL2), from the DRAM; DSOURCE is DFM(D2).

In the last microinstruction cycle of the page mode read access illustrated in FIG. 7A, an E-operation is executed. The DFM latch now presents the data D3, associated with the DRAM address (ROW, COL3), from the DRAM; DSOURCE is DMF(D3).

In the following, it is assumed that the row address is loaded into ADH.

Figure 7B:
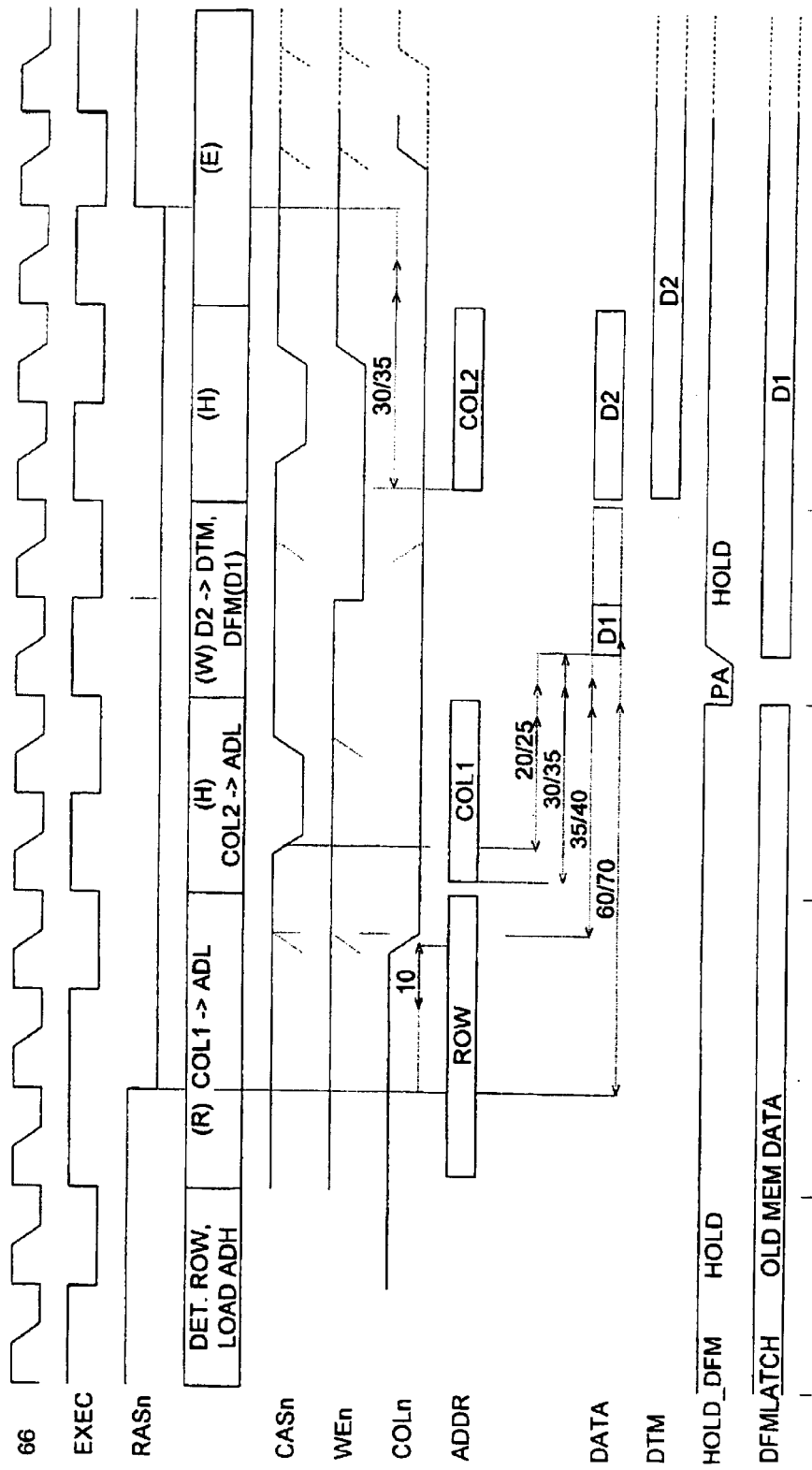

FIG. 7B is a schematic timing diagram of a page mode read write access according to a preferred embodiment of the invention. The sequence of DRAM control operations for a read write access is detailed in Table II above. An R-operation is executed, followed by an H-operation. The column address for writing is loaded into ADL in the microinstruction cycle of the H-operation, or alternatively in the next cycle. Next, a W-operation is executed and the data-to-memory (DTM) register is loaded. At the same time, the DFM latch presents the data D1 from the DRAM. In the next microinstruction cycle, an H-operation is executed and the column address (COL2) for writing is strobed into the DRAM and the data D2 in DTM is written into the DRAM. The access is ended by an E-operation.

Figure 7C:
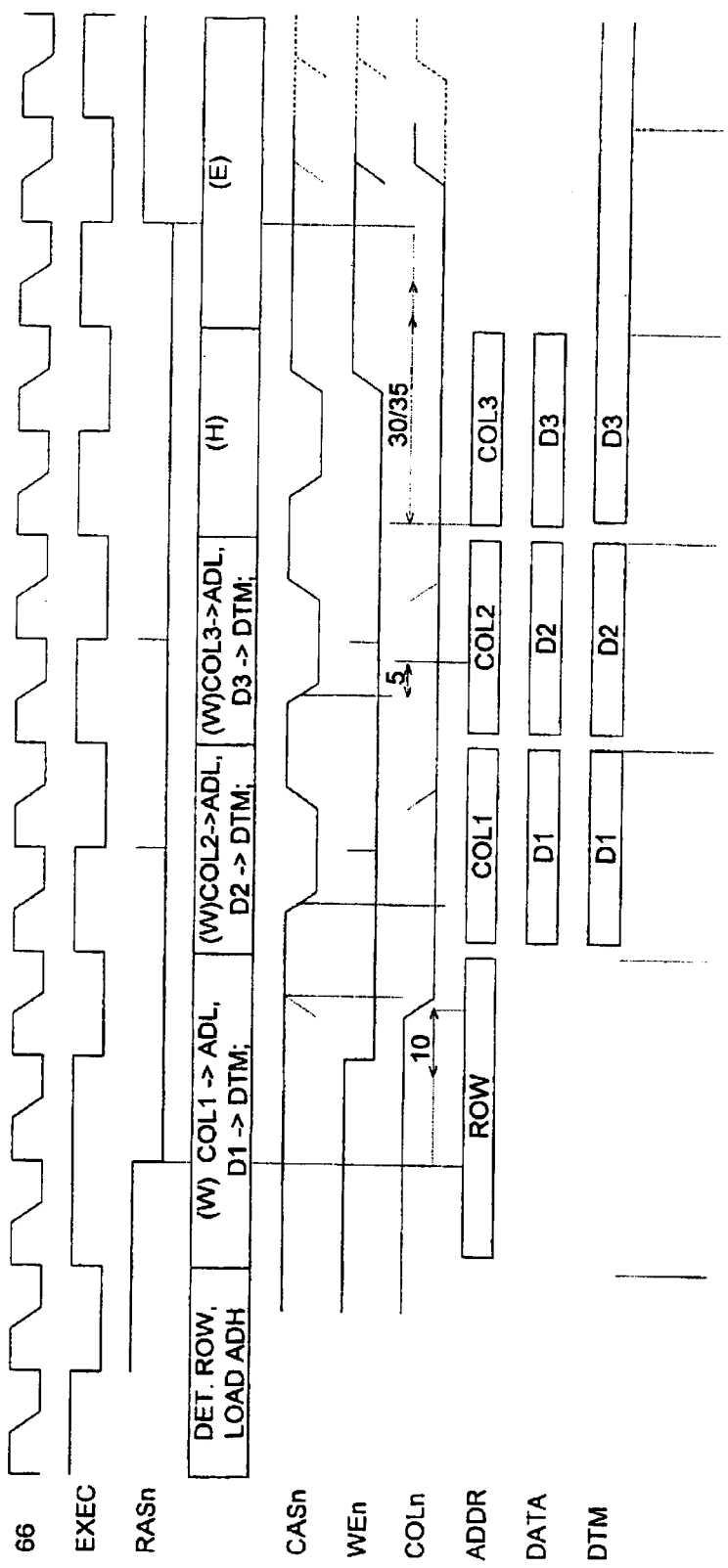

FIG. 7C is a schematic timing diagram of a page mode write access according to a preferred embodiment of the invention. The sequence of DRAM control operations for a page mode write access is detailed in Table II above. A page mode write access is similar to a page mode read access. W-operations are used instead of R-operations. The data to be written into the DRAM is loaded into the DTM register at least one microinstruction cycle before the actual writing into the DRAM.

Figure 7D:
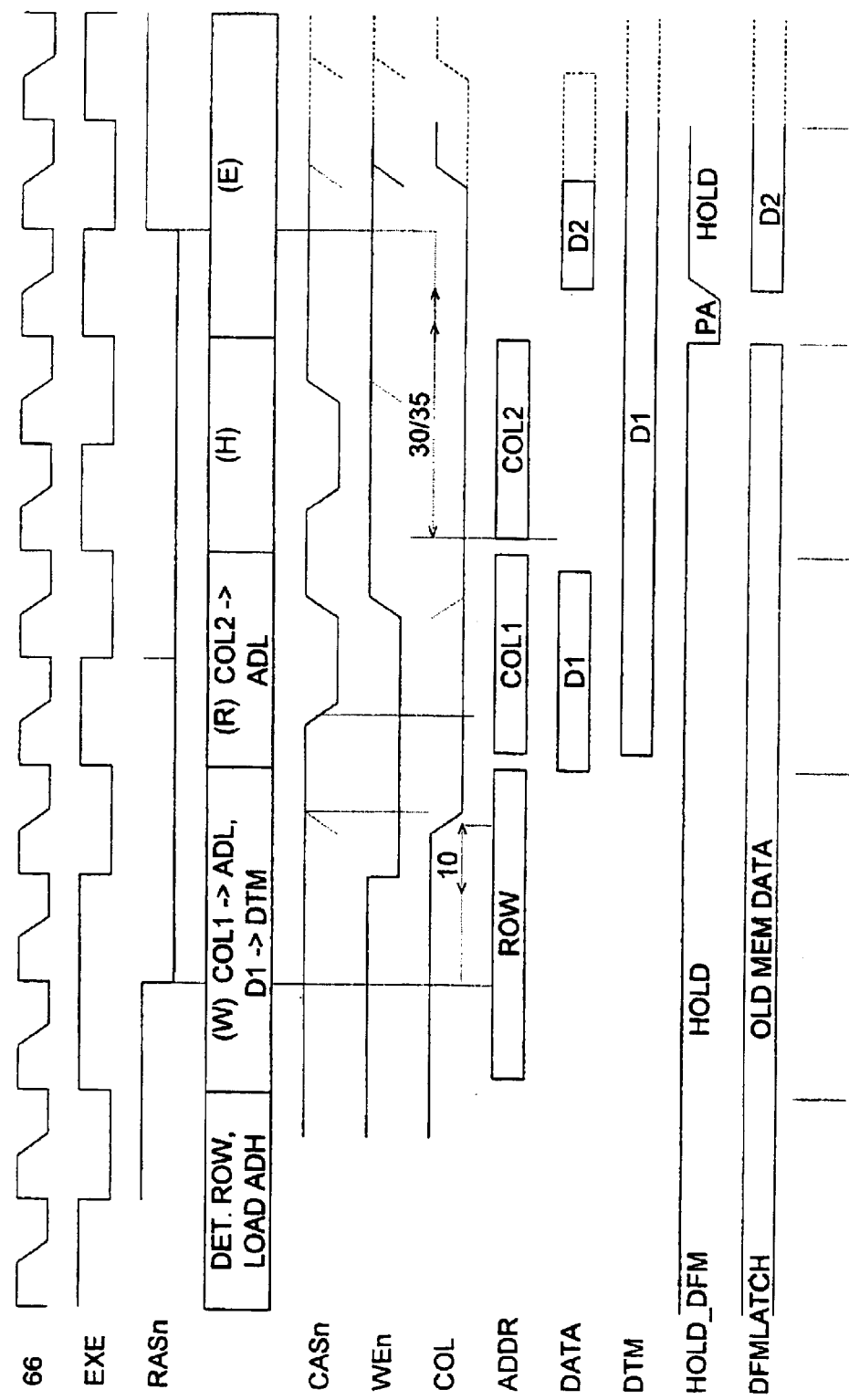

FIG. 7D is a schematic timing diagram of a page mode write read access according to a preferred embodiment of the invention. The sequence of DRAM control operations for a page mode write read access is detailed in Table II above. It should be noted that the W-operation is followed directly by an R-operation, without the need for an H-operation in between.

Figure 7E:
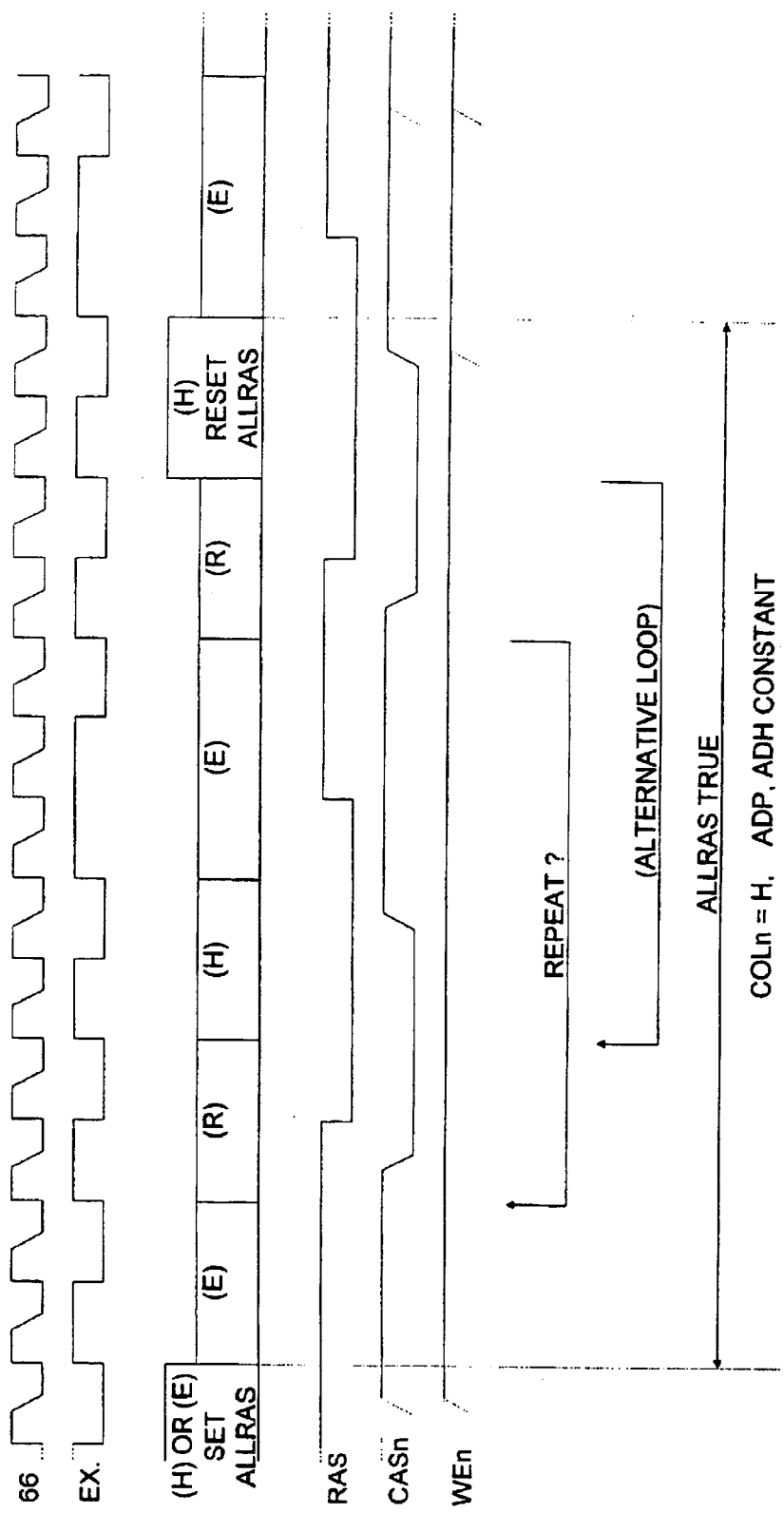

FIG. 7E is a schematic timing diagram of CAS before RAS refresh cycle according to a preferred embodiment of the invention. The sequence of DRAM control operations for such a DRAM access cycle starts with an H-operation in which ALLRAS is set, followed by an E-operation. When ALLRAS is set, the signal A goes high, and the control logic 52 (FIG. 6) is affected accordingly. Next, a sequence of the DRAM control operations R, H and E are repeated a suitable number of times, and in the last repetition the H-operation includes a reset of ALLRAS. The access cycle is terminated by an E-operation. Alternatively, a sequence of the DRAM control operations H, E and R is repeated.

Figure 8:
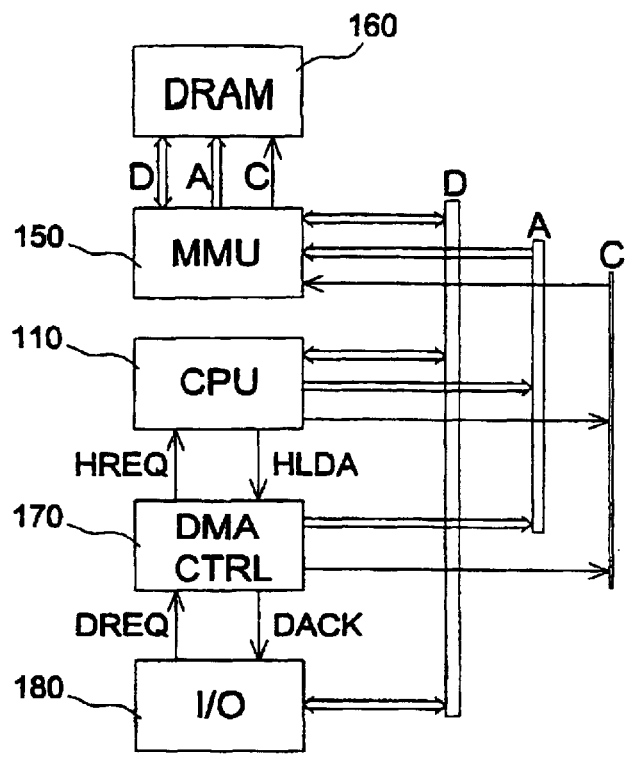
FIG. 8 is a schematic block diagram illustrating the conventional approach to DMA access.

FIG. 8 is a schematic block diagram illustrating the conventional approach to DMA access. Conventionally, direct memory access (DMA) from/to an input/output device 180 is handled by a DMA controller 170 which autonomously controls and addresses the primary memory 160 using the system busses and the standard memory management unit (MMU) 150 of the system. A representative example of prior art DMA controllers is the Intel 8237A DMA controller. The Intel 8237A controller has signals (HREQ=Hold Request, and HLDA=Hold Acknowledge) to and from the CPU 110 for hand-shaking, and through these signals the CPU 110 and the DMA controller 170 agree on which one of the two that shall drive memory control signals (C) and memory address signals (A). If a peripheral I/O device 180 requests DMA service by a DREQ signal, the DMA controller 170 signals HREQ, and when the CPU 110 can it stops driving the system busses (data bus-D, address bus-A and control bus-C) and then it signals HLDA to the DMA controller 170, which is allowed to drive the busses. The DMA controller 170 sends an acknowledgement signal DACK to the I/O-device, and starts the DMA transfer. When the DMA controller has completed a DMA transfer between the I/O device 180 and the primary memory 160 via the system busses, it takes the HREQ signal down. Now, the CPU 110 takes the HLDA signal down and starts to drive the system busses again.

For those interested in the conventional features of DMA controllers, reference is made to the specification *8237A High Performance Programmable DMA Controller* (8237A-5) from Intel Corporation (1993).

According to the invention, communication between peripheral input/output devices and the primary memory is accomplished via the internal data paths of the processor, using the microcode control of the processor memory interface described above. Transferring data between I/O devices and the primary memory using the internal data paths of the processor gives so-called "virtual" DMA transfers.

Figure 9:
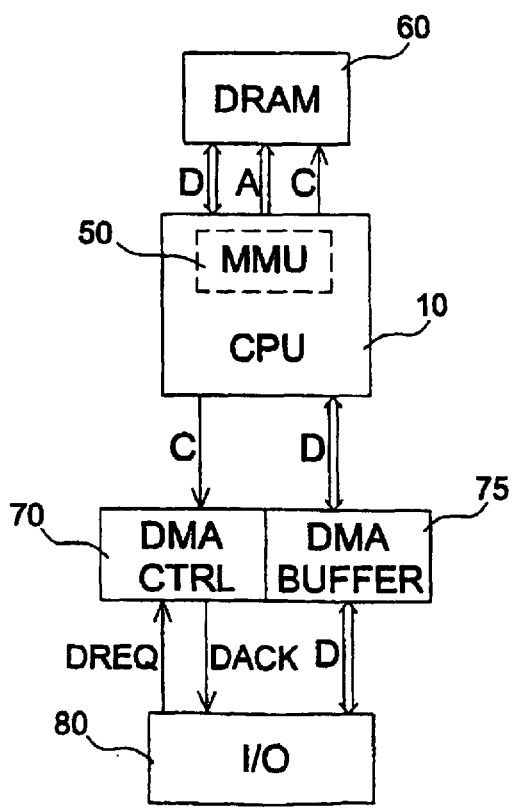
FIG. 9 is a schematic block diagram illustrating the communication between a peripheral input/output device and the primary memory according to a preferred embodiment of the invention.

FIG. 9 is a schematic block diagram illustrating the communication between a peripheral input/output device and the primary memory according to a preferred embodiment of the invention. The computer system of FIG. 9 basically comprises a CPU 10 with an integrated MMU 50, a primary memory such as a DRAM 60, a DMA controller 70 with an associated DMA buffer 75 and a peripheral I/O device 80. Preferably, the MMU 50 corresponds to the DRAM controller of FIG. 1.

Either the DMA controller 70 is integrated into the CPU 10 as illustrated in FIG. 1, or alternatively, the DMA controller 70 is implemented external to the CPU as shown in FIG. 9.

In contrast to conventional processors using the Intel 8237A or similar controller, the computer system according to the invention does not require a common system bus to which both memory and I/O devices are connected. Instead, the I/O bus of the system is utilized for inputs and outputs of data to/from the I/O device 80. The I/O bus preferably has a number of bi-directional data lines and a number of control lines including a clock. The clock for the I/O subsystem is called ICLK, and it has a duty cycle of 50% and its cycle time is preferably programmable by the processor for easy connection of peripherals of different speeds. All peripherals use ICLK to synchronize and detect valid levels on other interface signals. The ICLK clock signal is preferably derived from the processor oscillator frequency by a division by 2, 4, 8 or 16. In practice, this will yield a cycle time of 30, 60, 120 and 240 ns, respectively when using a oscillator frequency of 66 MHz. The processor system clock normally has a cycle time of 2 or 3 oscillator cycles, and therefore ICLK and EXEC are not synchronized. A microcoded event triggering an I/O activity (a pulse) therefore affects the first ICLK cycle following the first two oscillator cycles of the EXEC cycle executing the triggering microinstruction.

The ordinary hand-shaking takes time, and maximum transfer capacity is obtained when a large amount of data is buffered, and a relatively long sequence of data to/from the DRAM 60 is transferred at maximum speed after only a single hand-shake. Therefore, a special memory buffer, the DMA buffer 75, is utilized in connection with the DMA controller 70. Preferably, the DMA buffer 75 is shared by a number of DMA channels that are all configurable for input or output, and each DMA channel is dynamically allocated a respective area of the buffer 75. This allows channels that have a large data flow to be allocated a correspondingly larger area in the buffer. Each buffer area is typically operated as a FIFO buffer. When dealing with relatively small buffer memories, in the order of a few kilobytes, it is generally more cost effective to have a single common memory than several separate buffer memories. In general, there can be only one I/O device per DMA channel.

The use of a buffer memory means that the data transfer between the I/O device 80 and the primary DRAM memory 60 is divided into two basic transfers, one between the I/O device 80 and the DMA buffer 75, and one between the DMA buffer 75 and the DRAM 60. Preferably, the transfer between the DMA buffer 75 and the DRAM 60 is in turn divided into two transfers, one between the DMA buffer 75 and the internal data register 55 (the data-to-memory register and the data-from-memory latch) shown in FIG. 1, and one between the internal register 55 and the DRAM 60.

The transfer between the I/O device 80 and the DMA buffer 75 is normally controlled by the DMA controller 70 in response to the state of the DMA buffer (empty/not-empty at output and full/not-full at input) and signals from the input/output device (request/available). Preferably, this transfer does not involve the processor 10.

The transfer between the DMA buffer 75 and the DRAM 60 is controlled by a microcode instruction program in the processor 10 and makes use of the microcode DRAM control described in detail above. The microcode instruction program generates appropriate control signals C to the DMA controller 70 to initiate transfer of data between the DMA buffer 75 and the internal registers in the processor 10. The transfer of data between the internal registers and the DRAM 60 is controlled by a sequence of control instructions included in the microcode instructions of the microcode instruction program. The sequence of control instruction triggers a corresponding sequence of DRAM control operations, and by appropriately setting the sequence of control instructions almost any type of DRAM access, such as a read, write, page mode read, page mode write, page mode read write and page mode write read access can be obtained.

Transfer between the DMA buffer and the DRAM are preferably initiated by a sequence of the microcode instruction program that is activated at a certain frequency, for example 16 kHz or more. For a DMA channel programmed for input, the microcode instruction sequence may investigate whether a sufficient amount of data, for example 256 bytes, is present in the DMA buffer 75, and transfer, if enough data is present in the buffer, the data to the DRAM 60. For a DMA channel programmed for output, the microcode instruction sequence may investigate whether there is a sufficient amount of free space available in the DMA buffer 75, and fill the buffer, if enough space is available, with data from the DRAM 60.

Figure 10:
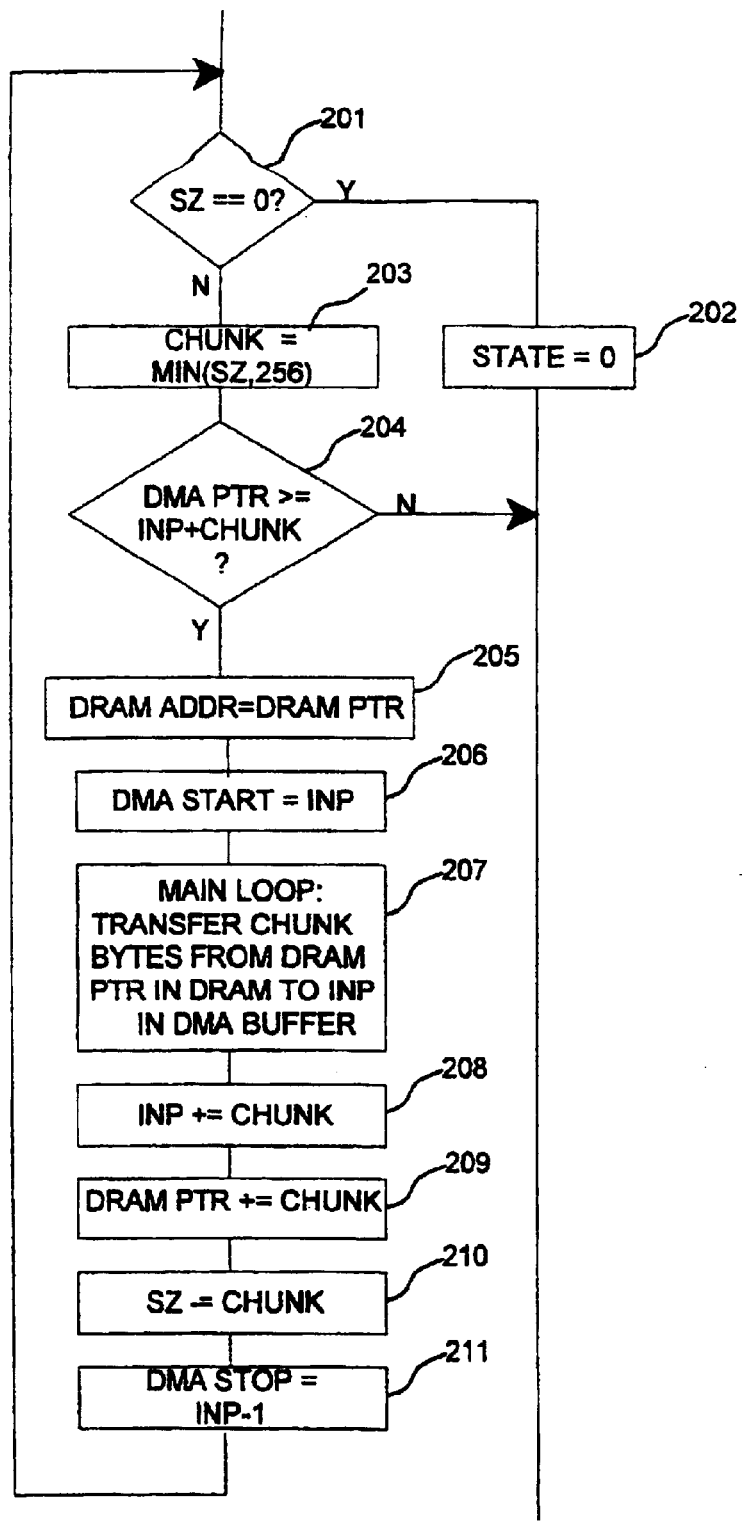
FIG. 10 is a schematic diagram illustrating an example of a microprogram flow for handling virtual DMA transfers.

FIG. 10 is a schematic diagram illustrating an example of a microprogram flow for handling a virtual DMA transfer in the direction from the memory. The DMA channels and their associated counters and pointers are set up by the processor under microprogram control, and at a certain frequency, a microprogram sequence 201 to 211 for transfer of data from the memory to the DMA buffer is initiated. For simplicity, notations from the C programming language is used in FIG. 10.

In step 201, it is first determined whether there is any data to be transferred. If there is no data (size is zero), a state signal is set to zero in step 202 and operation goes back to normal again. On the other hand, if there is data to be transferred, the chunk size is determined in step 203. Normally, the data is transferred in chunks of a predetermined size. It is often desired to transfer relatively large chunks. In a preferred embodiment, the chunk size is set to 256 bytes, or if the total amount of data to be transferred is smaller than 256 byes, all the data to be transferred will be transferred in a single chunk. In step 204, it is determined whether there is a sufficient amount of free space available in the DMA buffer by investigating if the DMA pointer for the DMA channel in question is greater than or equal to the sum of the chunk size and the position INP in the DMA buffer at which the write input ended at the previous chunk transfer. If no (N), the DMA transfer is suspended for the time being and operation goes back to normal again. If yes (Y), the microprogram sequence continues with steps 205 to 211. In step 205, the DRAM address for read out is assigned. In step 206, the start position in the DMA buffer for write input is assigned the value of INP. Step 207 consists of the main loop for transferring a chunk of bytes from the DRAM to the DMA buffer, given the start address in the DRAM and the start position for write input in the DMA buffer. Next, the value of INP is increased by the chunk size (step 208), the value of the DRAM pointer is increased by the chunk size (step 209), and the value of the size parameter is decreased by the chunk size (step 210. A DMA stop register for the DMA channel in question is set to the value of (INP-1) and indicates the position at which the DMA transfer is stopped. The microprogram flow of step 201 to 211 is repeated until all data has been transferred from the memory to the DMA buffer or until the DMA buffer is full. The I/O device reads data from the DMA buffer as and when required by the I/O device.

Transfer from the DMA buffer into the DRAM follow a corresponding microprogram flow, which then is adapted for input to the memory instead of output from the memory.

Alternatively, instead of a DMA buffer 75 connected to the DMA controller 70, each I/O device has a corresponding I/O buffer memory which is controlled by the input/output controller of the I/O device.

FIGS. 11A–E are schematic signal timing diagrams of different illustrative basic input/output operations according to a preferred embodiment of the invention.

Signals and signal lines involved in the basic input/output operations are described in Table III below.

TABLE III

| Name | Type | Description |
| --- | --- | --- |
| ICLK | Output | I/O clock. A programmable-frequency system clock for the I/O subsystem. All control lines and data lines are |

TABLE III-continued

| Name | Type | Description |
|---|---|---|
| | | valid on its rising edge. An I/O cycle is the time between two successive rising edges of this clock. |
| ID0..7 | Bi-directional | In this example, eight bi-directional data lines shared by all peripherals. When the processor drives these lines, it will only drive them during the later half of the I/O cycle in order to give any peripherals that may have been driving the lines in the previous cycle to release enough time to tristate the bus. |
| IDREQ0..3 | Input, active low | In this example, four DMA request lines, one for each channel, used by peripherals to request a DMA transfer. |
| IDACK0..3 | Output, active low | In this example, four DMA acknowledgement lines, one for each channel, used by the processor to acknowledge a DMA transfer. |
| ILIOA | Output, active low | Load I/O address. Used by the processor to send commands to the peripherals. Each peripheral responds to its own set of I/O addresses. |
| ILDOUT | Output, active low | Load output. Used by the processor to send data to a selected peripheral. |
| INEXT | Output, active low | Next input. Used by the processor to read data from a selected peripheral. The read data is stored by the processor in an internal data input register. |

In this example, the processor, referred to the as host in FIGS. 11A–E, performs programmed inputs/outputs by using microprogram pulses called LIOA (LOAD IO ADDR), LDOUT (LOAD OUTPUT) and NEXT (NEXT INPUT).

LIOA is used to select, deselect and control peripherals. Every peripheral has its own range of unique I/O addresses to which it responds.

LDOUT is used to write data to peripherals. The peripheral must have been set up previously by an I/O address to accept the data.

Next is used to tell a peripheral to present a new data byte on the data lines. The peripheral must first have been set up by an I/O address. The data is stored in an internal data input register (DATA FROM I/O), and then the processor can read the contents of the DATA FROM I/O register using "DSOURCE INDATA".

For a DMA transfer, a peripheral I/O device 80 wanting DMA service uses its own IDREQ line to request service, and then awaits acknowledgement by the DMA controller 70 on the corresponding IDACK line. Data is transferred on the rising edge of the ICLK clock signal when IDACK is active. Preferably, the DMA controller 70 is set up by the processor as if it was just another I/O device. For example, the address space reserved for the DMA controller is OOh-OFh.

Examples of commands that can be issued by the processor to the DMA controller are given in Table IV below.

TABLE IV

| Addr | Command | Parameter bytes | Description |
|---|---|---|---|
| 00 | Set base | 4/o | Sets the address spaces for the DMA buffers in SRAM. In this example, the four parameters are the address limits of the four DMA buffers. DMA buffer 0 runs from logical address 0000h up to, but not including, the address specified by the first parameter. DMA buffer 1 follows immediately after buffer 0 and continues to the second parameter etc. An address is given as one byte containing bits 10–4 of the total 11-bit logical address, bits 3–0 are set to zero, giving a smallest nonzero buffer size of 16 bytes. Logical address 0000h maps to the highest physical address and increasing logical addresses map to decreasing physical ones. |
| 01 | Terminate | 0 | Terminates a command in progress. |
| 02 | Reset | 0 | Resets the DMA controller. |
| 03 | Set mode X | 2/o | Sets the operation mode of DMA channel X. N is the total number of DMA channels. Bits 7–5 of the first parameter byte are mode flags, bits 2–0 of the first byte plus the second byte form an 11-bit stop address. The mode flags have functions as follows: Bit 7: 1 = DMA channel active, 0 = DMA channel inactive. Bit 6: 1 = Direction is output (processor to peripheral), 0 = Direction is input. Bit 5: 1 = Use stop address, 0 = Don't use stop address. If the stop address is used, DMA transfers on this channel will no longer be granted once that the DMA |

TABLE IV-continued

| Addr | Command | Parameter bytes | Description |
|---|---|---|---|
| | | | address counter has reached that address. DMA will not continue until the stop address is changed or flag bit 5 is set to 0. |
| 03+N | Get ptr X | 2/i | Gets the current 11-bit absolute logical DMA pointer for channel X. This pointer points after the last byte transferred over this DMA channel. The pointer wraps to the start of the buffer when the buffer end is reached. |
| 03+2N | Read/write buf | 2/o | Reads/writes DMA buffer 0: Following this order, any number of bytes can be read/written (using NEXT INPUT/LOAD OUTPUT) until the "Terminate" command is given. The parameter bytes are an 11-bit start pointer, pointing to the first location to be read/written. After each byte read/written, the pointer is automatically incremented and wrapped if necessary. |

The parameter field shows the number of bytes that follow the I/O address and the direction of the bytes ("o" means that the bytes are written by the processor using LDOUT, and "i" means that the bytes are read by the processor using NEXT).

In the processor-to-peripheral directed cases (LIOA and LDOUT) the data lines ID are driven by the output register DATA TO I/O, which is loaded from the D-bus. In the peripheral-to-processor directed cases (NEXT), the input register DATA FROM I/O is loaded from the data lines. The input register DATA FROM I/O is available to the microprogram as a D-bus source (DSOURCE INDATA).

Figure 11A:
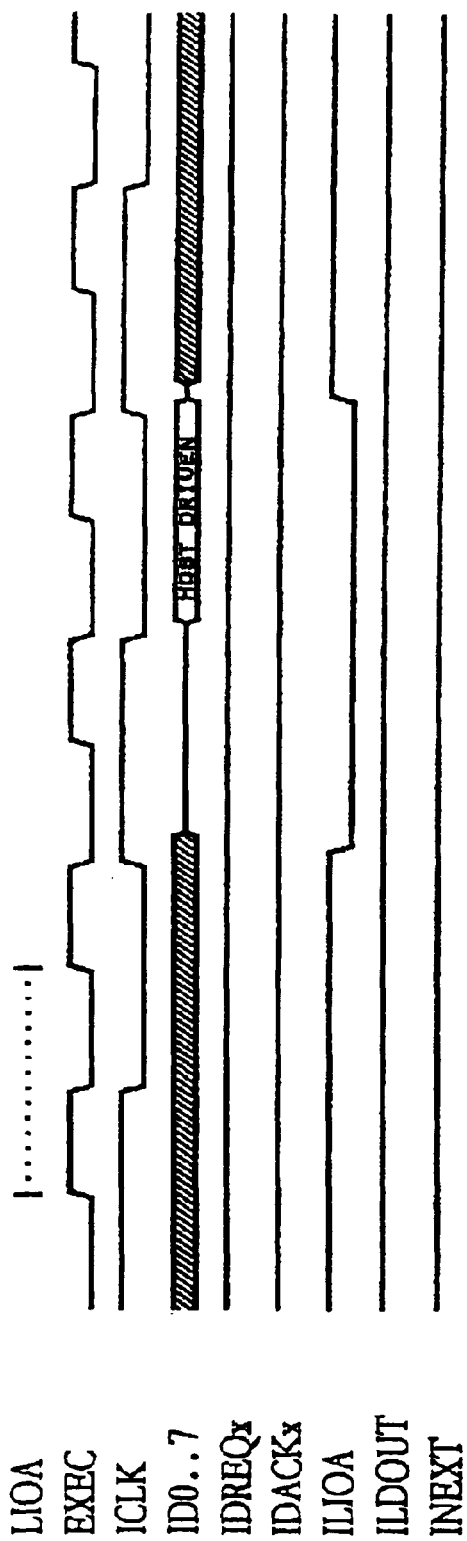
FIGS. 11A–E are schematic signal timing diagrams of different illustrative basic input/output operations according to a preferred embodiment of the invention.

FIG. 11A shows the waveforms for loading an I/O address—the processor sends a command to a peripheral.

Figure 11B:
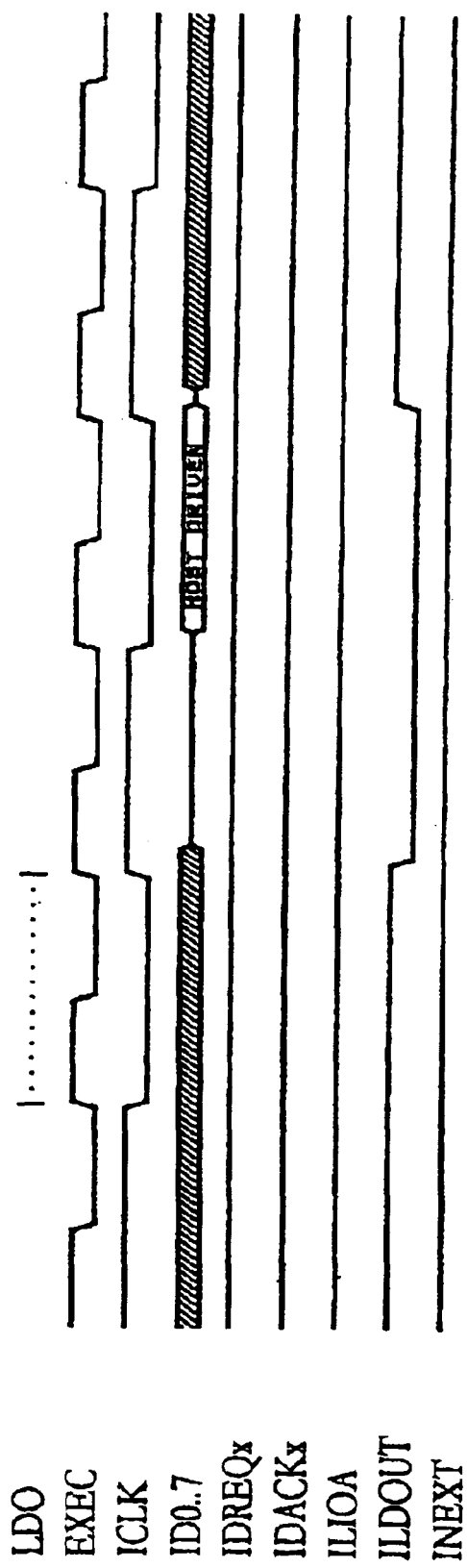

FIG. 11B shows the waveforms for loading an output—the processor sends data to a selected peripheral.

Figure 11C:
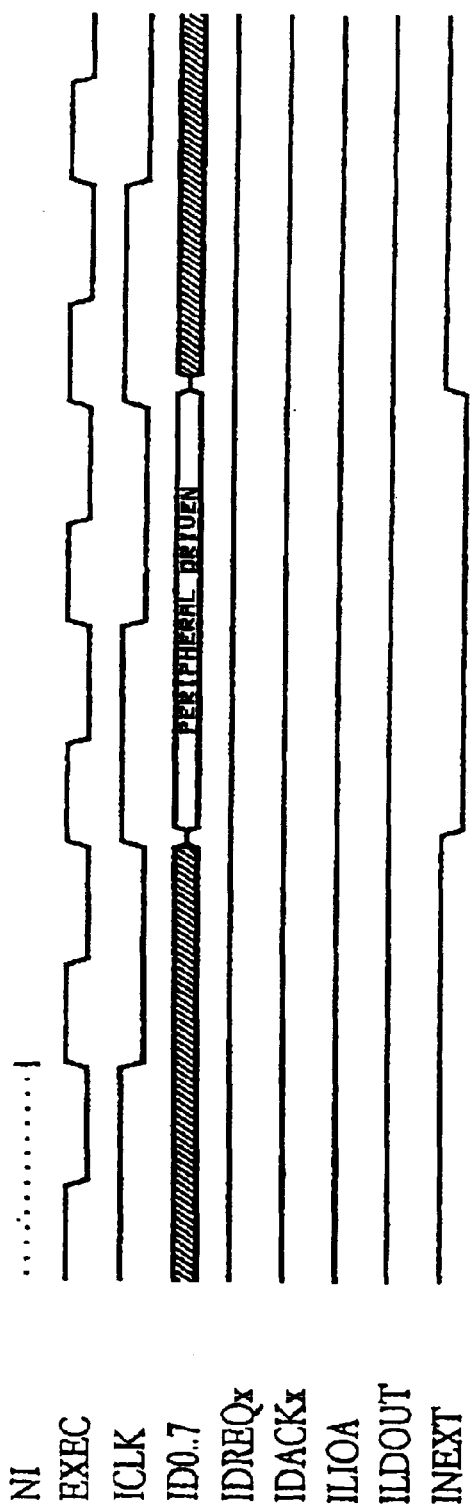

FIG. 11C shows the waveforms for a next input—the processor reads data from a selected peripheral.

Figure 11D:
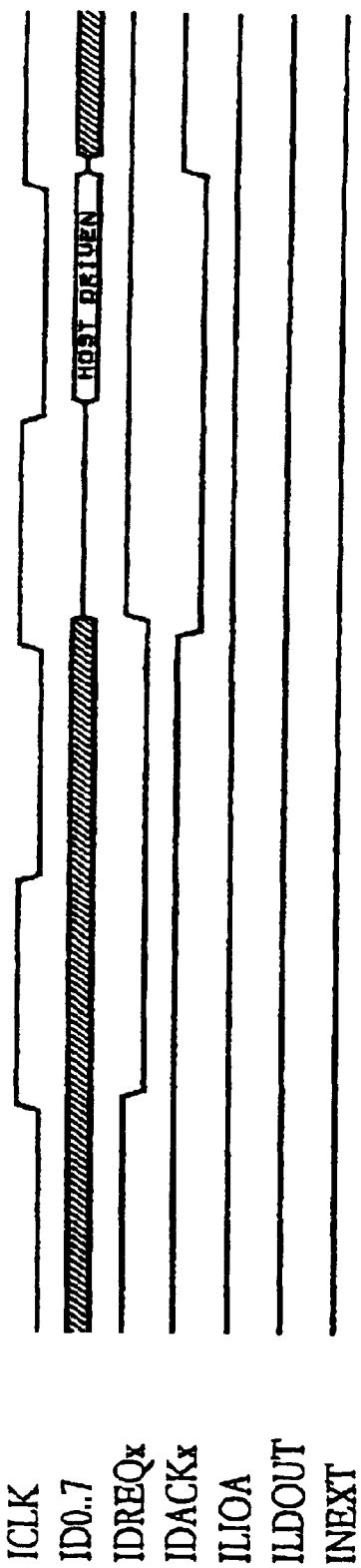

FIG. 11D shows the waveforms for a DMA to a peripheral. The processor writes a byte of data to a peripheral using DMA.

Figure 11E:
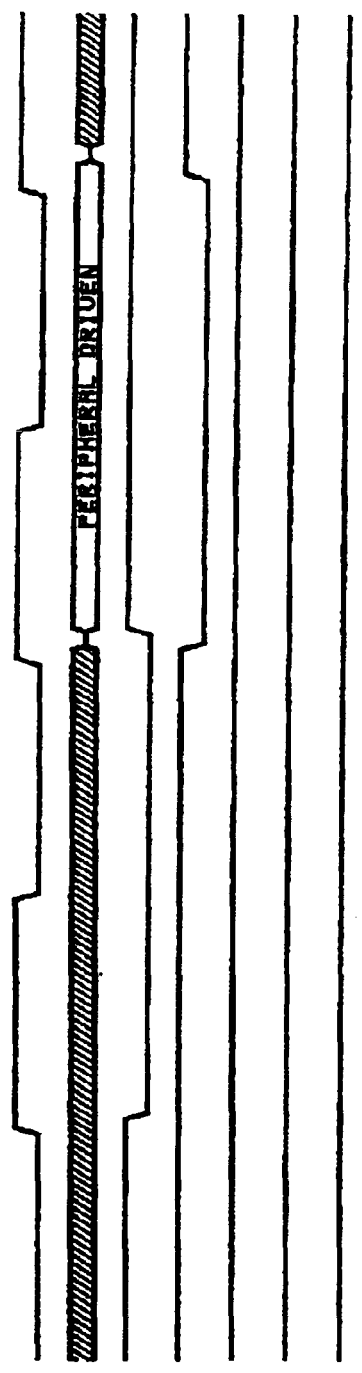

FIG. 11E shows the waveforms for a DMA from a peripheral. A peripheral writes a byte of data to the processor using DMA.

A DMA transfer does not take place until the processor acknowledges it by activating IDACk, and this does not necessarily happen at the first clock after IDREQ is asserted.

By integrating the control of virtual DMA transfers into the microcode instruction program of the processor, a minimum of hardware control logic is required. In addition, microprogram control of the virtual DMA transfers makes it possible to perform data processing and/or data monitoring of the data transferred between the I/O device and the DRAM 60. Since the data transferred in a virtual DMA transfer now passes through the processor, and the transfer is controlled by a microcode program, the data can be passed through the ALU of the processor and the microcode program can be adapted to perform specific operations on the data in the ALU.

For example, a DMA channel may be programmed for input, but is actually served by a special microprogram sequence, which searches the input data for an addressing sequence, perhaps by counting bytes in a frame and/or searching for a particular pattern, and when finding the addressing sequence it investigates whether the device is addressed or not. This can be done without causing a memory transfer or other processing. When the device is addressed, the microprogram sequence starts transferring input data to the memory or another input/output device, and when a sufficient amount of data has been transferred it generates an interrupt to the interrupt system.

Another example is that a microprogram sequence is configured for outputting input data, received on a first DMA channel from an input device, on another DMA channel to an output device, instead of or perhaps at the same time as the microprogram sequence transfers the input data to the DRAM. This is advantageous in communication applications, especially in combination with the addressing procedure above.

An important example of data processing and monitoring performed on a DMA data stream is checksum calculation. Suppose that the DRAM is 8 bits wide, and that a large number of 8-bit bytes stored in consecutive locations in DRAM are to be output, via DMA, to some communication channel, for transfer to a similar system. The receiving system uses DMA to input the data into its DRAM. Suppose there is a need for the receiving system to check for transmission errors, and that the transmitting system should therefore divide the stream into blocks and append a checksum to each block. A simple example of a checksum is LRC=Longitudinal Redundancy Check, which is a byte where each bit is equal to the result of an exclusive- or combination of the corresponding bit from all the bytes in the block. The receiver would transfer data bytes to its memory, but also accumulate a checksum byte in a register, by—for each received byte—replacing the old register contents with the bit-wise exclusive-or combination of the byte and the old register contents. When this has also been performed for the received appended checksum byte, the register contents should be the same as it was before receiving the first data byte of the block. If not, the receiver would discard the block.

Processing in the transmitting and/or the receiving system may require that the stored data blocks are stored consecutively without being separated by the appended checksum bytes.

Data to be transmitted could be prepared by the transmitting system by copying the number of bytes corresponding to one block to another area in the DRAM where the LRC byte could be appended. Then the DMA process could be set up to transfer the block, with LRC, from that area.

A normal DMA output transfer from the DRAM to the I/O buffer memory would, using the proposed system, be controlled by one microinstruction, which would do the following: "Read data byte from DRAM, write data to I/O buffer memory, increment memory pointer and buffer memory pointer registers, decrement byte count" In the proposed system, this would not require the use of the processor arithmetic unit.

The copying to the extra output area in DRAM costs at least two DRAM page mode cycles per byte. This time can be saved by not using this extra area, and instead reading directly from the bigger source area and letting the microinstruction that does the transfer to the I/O buffer memory also do the checksum calculation. In both cases the LRC accumulation would be hidden by the move, i.e. would not take additional time.

In the receiving system a similar saving of time could—with some assumptions—be accomplished in the corresponding way.

This special processing combined with the DMA transfer could be turned on and off and/or could be coupled to the use of a certain unit or channel number. Different variants of processing can be included in different paths in the microcode that is invoked when the DMA hardware needs service. Path-selecting switches can be controlled by parameters stored in DRAM under software control.

Further examples of data processing include data conversion, data encoding, data decoding, image data compression, image data decompression, scaling, and pattern matching. Integrating the data processing in the virtual DMA transfers substantially reduces the number of times the processor needs to process the data, and this is of great importance in applications of high computational intensity and complexity.

In the currently most preferred embodiment of the invention, the central processor is a complex instruction set computing (CISC) processor, and complex instructions are stored in the DRAM and executed by microcode instructions stored in the microcode program memory. The microcode program memory is preferably static, although nothing prevents it from being dynamic. In this case, the complex instructions, also referred to as high-level machine instructions, as well as the data are stored in the DRAM, and therefore the computer system may be referred to as a CISC with von Neumann architecture. When the microcode program has selected and activated a row in the DRAM, the microcode program has quick access to all the memory cells of the row, in any arbitrary order and with an arbitrary combination of read and write operations.

Alternatively, the arithmetical part of the processor is designed to have two DRAM-interfaces, one interface for the complex instructions and one for data. This would then enable a CISC with Harvard architecture.

However, the "microcode instructions" could be the instructions of a reduced instruction set computing (RISC) processor, so that the computer system would be referred to as a RISC-system with Harvard architecture; where instructions and data are stored in different memories.

It should be understood that the number of DRAM control operations is not limited to four as in the preferred embodiment of the invention. It is possible to use more or less than four DRAM control operations. The number of controls bits in each microcode instruction will then be modified accordingly. If more than four DRAM control operations are used by the invention, each microcode instruction has to include more than two control bits. A single control bit can distinguish between two DRAM control operations.

The embodiments described above are merely given as examples, and it should be understood that the present invention is not limited thereto. Further modifications, changes and improvements which retain the basic underlying principles disclosed and claimed herein are within the scope and spirit of the invention.

What is claimed is:

1. A method for controlling access to a dynamic random access memory (DRAM) arranged in a computer system having a processor controlled by a microcode instruction program, and a memory controller, wherein said method comprises the step of performing, for each DRAM access, a sequence of a predetermined number of DRAM control operations, in response to a corresponding sequence of control instructions included in microcode instructions of said microcode program of the processor, wherein each DRAM control operation corresponds to a predetermined sub cycle of a DRAM access so that an entire sequence of DRAM control operations is required for a complete DRAM access.

2. The method according to claim 1, wherein each microcode instruction includes a control instruction, formed by at least one control bit, controlling which one of a plurality of predefined DRAM control operations to perform.

3. The method according to claim 2, wherein said predefined DRAM control operations are arrangeable to form said sequence of DRAM control operations such that a read access, a write access, a page mode read access, a page mode write access, a page mode read write access or a page mode write read access to said DRAM is enabled.

4. The method according to claim 1, wherein at least one control instruction in said sequence of control instructions temporarily puts the memory cycle of said DRAM on hold.

5. The method according to claim 1, wherein said method further comprises the steps of selecting the cycle time of each microcode instruction from a number of different cycle times such that the cycle time of each microcode instruction matches the duration of the corresponding DRAM control operation.

6. The method according to claim 5, wherein each microcode instruction includes a cycle time control bit determining the cycle time of the microcode instruction, a first logical state of the cycle time control bit indicating a first cycle time and a second logical state of the cycle time control bit indicating a second extended cycle time.

7. The method according to claim 2, wherein a first one, referred to as an R-operation, of said predetermined DRAM control operations includes the steps of:
selectively, if inactive, activating a row address strobe (RAS) signal to said DRAM;
selectively enabling a valid row address to be forwarded to said DRAM, and, a first predetermined period of time later, enabling a valid column address to be forwarded to said DRAM;
selectively, if active, deactivating a write enable (WE) signal to said DRAM; and
selectively, if active, deactivating a column address strobe (CAS) signal to said DRAM, and, a second predetermined period of time later, in the next microinstruction cycle, activating said CAS signal.

8. The method according to claim 2, wherein a second one, referred to as a W-operation, of said predefined DRAM control operations includes the steps of:
selectively, if inactive, activating a row address strobe (RAS) signal to said DRAM;
enabling a valid row address to be forwarded to said DRAM, and, a first predetermined period of time later, enabling a valid column address to be forwarded to said DRAM;
selectively, if inactive, activating a write enable (WE) signal to said DRAM; and
selectively, if active, deactivating a column address strobe (CAS) signal to said DRAM, and, a second predetermined period of time later, in the next microinstruction cycle, activating said CAS signal.

9. The method according to claim 2, wherein a third one, referred to as a H-operation, of said predefined DRAM control operations includes the steps of:
deactivating a column address strobe (CAS) signal to said DRAM; and
deactivating a write enable signal to said DRAM.

10. The method according to claim 2, wherein a fourth one, referred to as an E-operation, of said predefined DRAM control operations includes the steps of:
deactivating a row address strobe (RAS) signal to said DRAM;
selectively, if active, deactivating a column address strobe (CAS) signal to said DRAM;
selectively, if active, deactivating a write enable (WE) signal to said DRAM; and
enabling a valid row address to be forwarded to said DRAM.

11. The method according to claim 2, wherein an R-operation of said predefined DRAM control operations includes the steps of:
selectively, if inactive, activating a row address strobe (RAS) signal to said DRAM;
selectively enabling a valid row address to be forwarded to said DRAM, and, a first predetermined period of time later, enabling a valid column address to be forwarded to said DRAM;
selectively, if active, deactivating a write enable (WE) signal to said DRAM; and
selectively, if active, deactivating a column address strobe (CAS) signal to said DRAM, and, a second predetermined period of time later, in the next microinstruction cycle, activating said CAS signal;
wherein an H-operation of said predefined DRAM control operations includes the steps of:
deactivating a column address strobe (CAS) signal to said DRAM; and
deactivating a write enable signal to said DRAM;
wherein an E-operation of said predetermined DRAM control operations includes the steps of:
deactivating a row address strobe (RAS) signal to said DRAM;
selectively, if active, deactivating a column address strobe (CAS) signal to said DRAM; and
selectively, if active, deactivating a write enable (WE) signal to said DRAM; and
enabling a valid row address to be forwarded to said DRAM; and
wherein, for a read access to said DRAM, said sequence of DRAM control operations includes an R-operation, an H-operation and an E-operation, in that order.

12. The method according to claim 2, wherein a W-operation of said predefined DRAM control operations includes the steps of:
selectively, if inactive, activating a row address strobe (RAS) signal to said DRAM;
enabling a valid row address to be forwarded to said DRAM, and, a first predetermined period of time later, enabling a valid column address to be forwarded to said DRAM;
selectively, if inactive, activating a write enable (WE) signal to said DRAM; and
selectively, if active, deactivating a column address strobe (CAS) signal to said DRAM, and, a second predetermined period of time later, in the next microinstruction cycle, activating said CAS signal;
wherein an H-operation of said predetermined DRAM control operations includes the steps of:
deactivating a column address stroke (CAS) signal to said DRAM; and
deactivating a write enable signal to said DRAM;
wherein an E-operation of said predefined DRAM control operations includes the steps of:
deactivating a row address strobe (RAS) signal to said DRAM;
selectively, if active, deactivating a column address strobe (CAS) signal to said DRAM;
selectively, if active, deactivating a write enable (WE) signal to said DRAM; and
enabling a valid row address to be forwarded to said DRAM; and
wherein, for a write access to said DRAM, said sequence of DRAM control operations includes a W-operation, an H-operation and an E-operation, in that order.

13. The method according to claim 2, wherein an R-operation of said predetermined DRAM control operations includes the steps of:
selectively, if inactive, activating a row address strobe (RAS) signal to said DRAM;
selectively enabling a valid row address to be forwarded to said DRAM, and, a first predetermined period of time later, enabling a valid column address to be forwarded to said DRAM;
selectively, if active, deactivating a write enable (WE) signal to said DRAM; and
selectively, if active, deactivating a column address strobe (CAS) signal to said DRAM, and a second predetermined period of time later, in the next microinstruction cycle, activating said CAS signal;
wherein an H-operation of said predetermined DRAM control operations includes the steps of:
deactivating a column address strobe (CAS) signal to said DRAM; and
deactivating a write enable signal to said DRAM;
wherein yet another one, referred to as an E-operation, of said predefined DRAM control operations includes the steps of:
deactivating a row address strobe (RAS) signal to said DRAM;
selectively, if active, deactivating a column address strobe (CAS) signal to said DRAM;
selectively, if active, deactivating a write enable (WE) signal to said DRAM; and
enabling a valid row address to be forwarded to said DRAM; and
wherein, for a page mode read access to said DRAM, said sequence of DRAM control operations includes a predetermined number of R-operations followed by an H-operation and an E-operation.

14. The method according to claim 2, wherein a W-operation of said predefined DRAM control operations includes the steps of:
selectively, if inactive, activating a row address strobe (RAS) signal to said DRAM;
enabling a valid row address to be forwarded to said DRAM, and, a first predetermined period of time later, enabling a valid column address to be forwarded to said DRAM;
selectively, if inactive, activating a write enable (WE) signal to said DRAM; and selectively, if active, deactivating a column address strobe (CAS) signal to said DRAM, and, a second predetermined period of time later, in the next microinstruction cycle, activating said CAS signal;

wherein an H-operation of said predefined DRAM control operations includes the steps of:
  deactivating a column address strobe (CAS) signal to said DRAM; and
  deactivating a write enable signal to said DRAM;

wherein an E-operation of said predefined DRAM control operations includes the steps of:
  deactivating a row address strobe (RAS) signal to said DRAM;
  selectively, if active, deactivating a column address strobe (CAS) signal to said DRAM;
  selectively, if active, deactivating a write enable (WE) signal to said DRAM; and
  enabling a valid row address to be forwarded to said DRAM; and wherein, for a page mode write access to said DRAM, said sequence of DRAM control operations includes a predetermined number of W-operations followed by an H-operation and an E-operation.

15. A controller for a dynamic random access memory (DRAM) in a computer system having a processor with a processor control unit implemented by a microcode program, wherein said DRAM controller is operable for executing, for each DRAM access, a sequence of DRAM control operations in response to a corresponding sequence of control instructions included in microcode instructions of said microcode program, each DRAM control operation corresponds to a predetermined sub cycle of a DRAM access so that an entire sequence of DRAM control operations is required for a complete DRAM access.

16. The DRAM controller according to claim 15, wherein each control instruction, formed by at least one control bit, controls which one of a plurality of predetermined DRAM control operations to perform.

17. The DRAM controller according to claim 15, wherein the cycle time of each microcode instruction is extendable such that the cycle time of each microcode instruction matches the duration of the corresponding DRAM control operation.

18. The DRAM controller according to claim 17, wherein the cycle time of each microcode instruction is extendable by means of a cycle time control instruction included within the microcode instruction itself.

19. The DRAM controller according to claim 15, wherein at least one control instruction in said sequence of control instructions temporarily puts the memory cycle of said DRAM on hold.

20. The DRAM controller according to claim 15, wherein the microcode instructions of said processor are stored in a program memory separated from said DRAM.

21. The DRAM controller according to claim 15, wherein said DRAM controller is responsive to address information, determined by a number of microcode instructions of said processor, for addressing said DRAM.

22. The DRAM controller according to claim 15, wherein the microcode instructions of said processor are the instructions of a reduced instruction set computing (RISC) processor.

23. A computer system having a processor controlled by a microcode instruction program, a primary memory cooperating with said processor, and a memory controller for said primary memory,
  wherein said microcode program comprises microcode instructions, each microcode instruction having a special control instruction field holder a control instruction for memory access control; and
  wherein said memory controller is operable for executing, for each memory access, a sequence of memory control operations in response to a corresponding sequence of control instructions from said processor, each memory control operation corresponds to a predetermined sub cycle of a memory access, and an entire sequence of memory control operations is required for a complete memory access.

24. The computer system according to claim 23, wherein said primary memory is a DRAM, and said memory controller controls access to said DRAM by performing a sequence of DRAM control operations in response to said sequence of control instructions.

25. The computer system according to claim 24, wherein said processor and said DRAM are provided on the same circuit board.

26. The computer system according to claim 23, wherein said processor is a complex instruction set comprising (CISC) processor, and complex instructions are stored in said primary memory and executed by microcode instructions stored in a program memory in said processor.

27. The computer system according to claim 24, wherein the cycle time of each microcode instruction is extendable such that the cycle time of each microcode instruction matches the duration of the corresponding DRAM control operation.

28. A method for performing a virtual direct memory access (DMA) to a primary memory in a computer system having a processor controlled by a microcode instruction program, wherein said method comprises the steps of:
  storing data from/to a peripheral input/output device in a buffer;
  transferring said data between said buffer and said primary memory via internal data paths of the processor of the computer system, said data transfer being controlled by said a microcode instruction program of the processor,
  wherein said step of transferring data between said buffer and said primary memory includes the step of executing, for each access to said primary memory, a sequence of memory control operations in response to a corresponding sequence of control instructions included in microcode instructions of said microcode instruction program, each memory control operation corresponds to a predetermined sub cycle of a memory access, and an entire sequence of memory control operations is required for a completely memory access.

29. The method for performing a virtual DMA access to a primary memory according to claim 28,
  wherein said step of transferring data between said buffer and aid primary memory includes the steps of:
  transferring data between said buffer and an internal register of said processor in response to control signals generated by said microcode instruction program; and
  transferring data between said internal register and said primary memory in response to said sequence of control instructions included in microcode instructions of said microcode instruction program.

30. The method for performing a virtual DMA access to a primary memory according to claim 29, wherein said primary memory is a dynamic random access memory (DRAM), and said step of transferring data between said internal register and said DRAM includes performing a sequence of DRAM control operations in response to said sequence of control instructions.

31. The method for performing a virtual DMA access to a primary memory according to claim 28, wherein said method further comprises the step of regularly investigating whether a predetermined amount of data is present in said buffer for inputs to the primary memory, and whether there is a predetermined amount of free space available in said buffer for outputs from the primary memory, said transfer between said buffer and said primary memory being initiated in dependence upon the outcome of said investigation.

32. The method for performing a virtual DMA access to a primary memory according to claim 31, wherein said investigating step is performed by at least one microcode instruction that is activated at a predetermined frequency.

33. The method for performing a virtual DMA access to a primary memory according to claim 28, wherein said method further comprises at least one of processing and monitoring, in said processor, of data transferred between said buffer and said primary memory via said internal data paths of said processor.

34. The method for performing a virtual DMA access to a primary memory according to claim 33, wherein said processing comprises at least one of the following: data conversion, data encoding, data decoding, image data compression, image data decompression, scaling, pattern matching and checksum calculation.

35. A computer system having a processor controlled by a microcode instruction program and a primary memory coupled to said processor, wherein said computer system further comprises:

a buffer for storing data from/to a peripheral input/output device; and means for transferring said data between said buffer and said primary memory via internal data paths of the processor under the control of said microcode instruction program in the processor, wherein said means for transferring data between said buffer and said primary memory includes means for executing, for each access to said primary memory, a sequence of memory control operations in response to a corresponding sequence of control instructions included in microcode instructions of said microcode instruction program, each memory control operation corresponds to a predetermined sub cycle of a memory access, and an entire sequence of memory control operations is required for a complete memory access.

36. The computer system according to claim 35, wherein said means for transferring data between said buffer and said primary memory includes:

means for transferring data between said buffer and an internal register of said processor in response to control signals generated by said microcode instruction program; and means for transferring data between said internal register and said primary memory in response to a sequence of control instructions included in microcode instructions of said microcode instruction program.

37. The computer system according to claim 36, wherein said means for transferring data between said buffer and said internal register includes a DMA controller, which also controls transfer of data between said input/output device and said buffer.

38. The computer system according to claim 36, wherein said primary memory is a dynamic random access memory (DRAM), and said means for transferring data between said internal register and said DRAM includes a DRAM controller for performing a sequence of DRAM control operations in response to said sequence of control instructions.

39. The computer system according to claim 35, wherein said microcode instruction program of said processor is configured for performing at least one of processing and monitoring of data transferred between said buffer and said primary memory via the internal data paths of said processor.

40. The computer system according to claim 39, wherein said processing comprises at least one of the following: data conversion, data encoding, data decoding, image data compression, image data decompression, scaling, pattern matching and checksum calculation.

* * * * *